United States Patent
Toyama

(10) Patent No.: US 8,554,863 B2
(45) Date of Patent: Oct. 8, 2013

(54) MASTER AND SLAVE SYSTEM WHEREIN MASTER INTERFACE UNIT COMPARES PARAMETER FROM PAYLOAD OF PARAMETER OBTAINING COMMAND WITH COMMUNICATION CAPABILITY PARAMETER OF PARAMETER DISPLAY UNIT

(75) Inventor: Masayuki Toyama, Osaka (JP)

(73) Assignee: Panasonic Corporation, Osaka (JP)

( * ) Notice: Subject to any disclaimer, the term of this patent is extended or adjusted under 35 U.S.C. 154(b) by 62 days.

(21) Appl. No.: 13/144,300

(22) PCT Filed: Nov. 25, 2010

(86) PCT No.: PCT/JP2010/006877
§ 371 (c)(1),
(2), (4) Date: Jul. 13, 2011

(87) PCT Pub. No.: WO2011/064998
PCT Pub. Date: Jun. 3, 2011

(65) Prior Publication Data
US 2011/0289176 A1    Nov. 24, 2011

(30) Foreign Application Priority Data

Nov. 27, 2009  (JP) ................................. 2009-269737
Jan. 28, 2010  (JP) ................................. 2010-017437

(51) Int. Cl.
*G06F 15/16*   (2006.01)
*G06F 15/177*  (2006.01)

(52) U.S. Cl.
USPC .......................................... 709/208; 709/222

(58) Field of Classification Search
USPC .............. 708/208–211, 228; 709/228; 710/16
See application file for complete search history.

(56) References Cited

U.S. PATENT DOCUMENTS

| | | | | |
|---|---|---|---|---|
| 5,317,693 A | * | 5/1994 | Cuenod et al. | 710/9 |
| 5,613,160 A | * | 3/1997 | Kraslavsky et al. | 710/16 |
| 6,189,059 B1 | | 2/2001 | Sotek et al. | |
| 6,446,142 B1 | * | 9/2002 | Shima et al. | 710/16 |
| 6,467,065 B1 | | 10/2002 | Mendez et al. | |
| 7,072,994 B2 | * | 7/2006 | Britton | 710/9 |

(Continued)

FOREIGN PATENT DOCUMENTS

| | | |
|---|---|---|
| JP | 03-072740 A | 3/1991 |
| JP | 05-028195 A | 2/1993 |

(Continued)

OTHER PUBLICATIONS

International Search Report for corresponding International Application No. PCT/JP2010/006877 mailed Jan. 18, 2011.

*Primary Examiner* — Lance L Barry

(74) *Attorney, Agent, or Firm* — Renner, Otto, Boisselle & Sklar, LLP

(57) ABSTRACT

A communication system including a master device and one or more slave devices enables parameters of the slave devices to be set in an efficient manner. A master device (2) transmits a parameter setting command as a broadcast command. A slave device (1) receives the parameter setting command, and compares the received parameter value with a parameter value stored in a parameter display unit, and transmits a parameter setting command to which the comparison result has been added. The master device (2) receives the parameter setting command transmitted from the slave device (1) and determines that the parameter setting has been completed.

7 Claims, 27 Drawing Sheets

(56) References Cited

U.S. PATENT DOCUMENTS

| | | |
|---|---|---|
| 7,904,696 B2 * | 3/2011 | Wang et al. .................. 712/29 |
| 2004/0047298 A1 * | 3/2004 | Yook et al. .................. 370/254 |
| 2004/0257614 A1 * | 12/2004 | Tanimoto .................. 358/1.15 |
| 2007/0294443 A1 | 12/2007 | Berenbaum et al. |
| 2008/0068987 A1 | 3/2008 | Hida et al. |
| 2008/0189459 A1 | 8/2008 | Takeuchi |
| 2009/0177823 A1 | 7/2009 | Chao |
| 2011/0289176 A1 * | 11/2011 | Toyama .................. 709/211 |

FOREIGN PATENT DOCUMENTS

| | | |
|---|---|---|
| JP | 06-311171 A | 11/1994 |
| JP | 08-110878 | 4/1996 |
| JP | 10-028134 | 1/1998 |
| JP | 11-136244 A | 5/1999 |
| JP | 2001-103080 | 4/2001 |
| JP | 2003-143157 A | 5/2003 |
| JP | 2005-236613 | 9/2005 |
| JP | 2006-311294 | 11/2006 |
| JP | 2008-060636 | 3/2008 |

* cited by examiner (a)
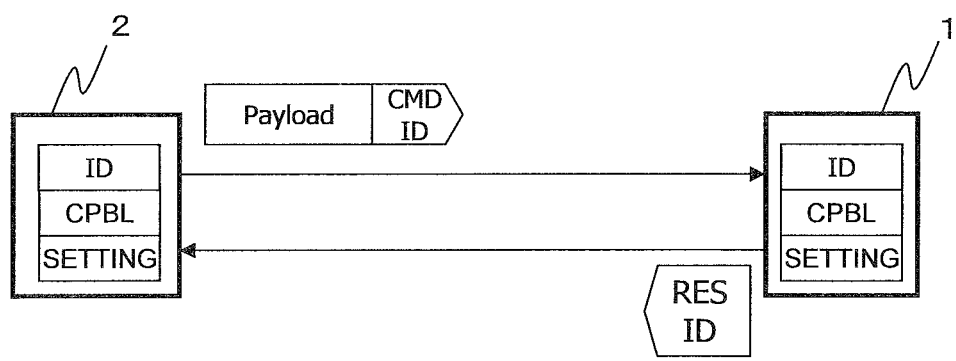
(b)
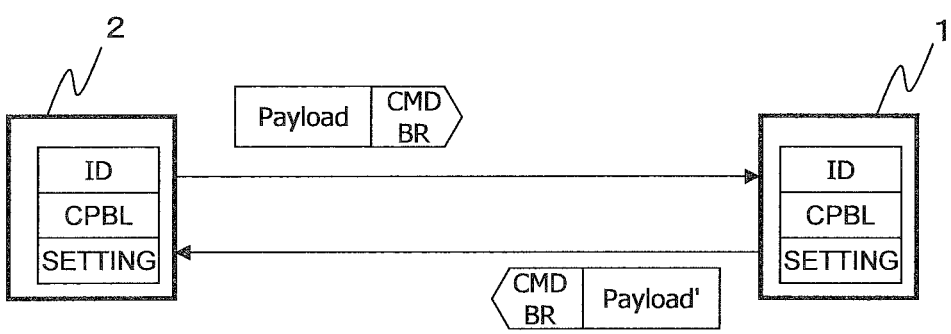
FIG. 4

Capability parameters (CPBL) 81

| Support interface performance |
| --- |
| Support data block length |
| Support transfer unit block number |
| Support data block length |
| Required power-saving mode shift time |
| Required power-saving mode recovery time |
| Required synchronization symbol number |
| Required block interval |

Setting parameters (SETTING) 82

| Interface performance |
| --- |
| Data block length |
| Transfer unit block number |
| Data block length |
| Power-saving mode shift time |
| Power-saving mode recovery time |
| Synchronization symbol number |
| Block interval |

FIG. 8

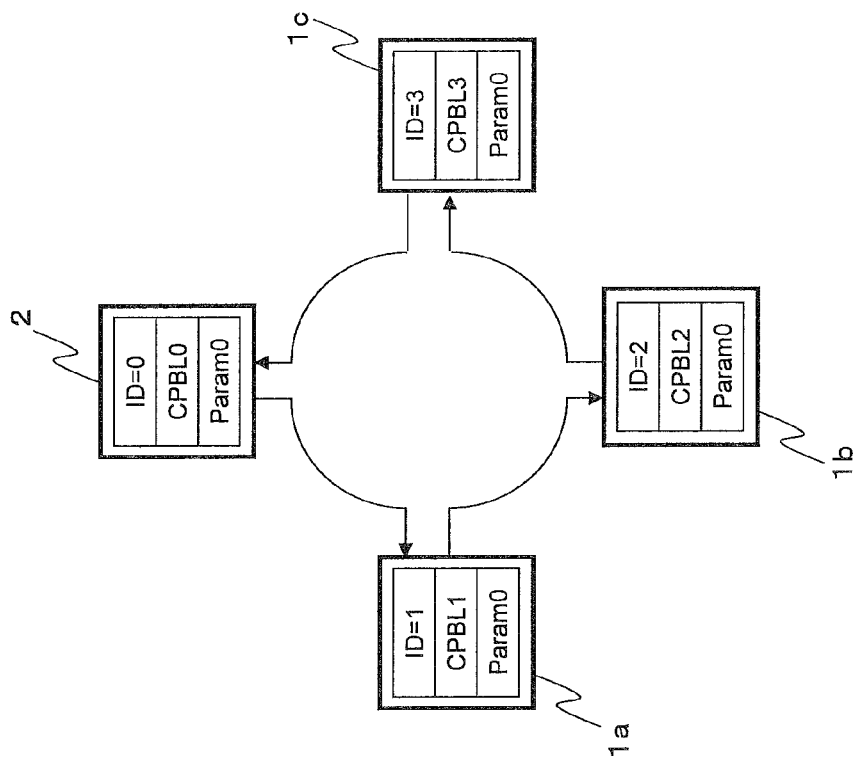
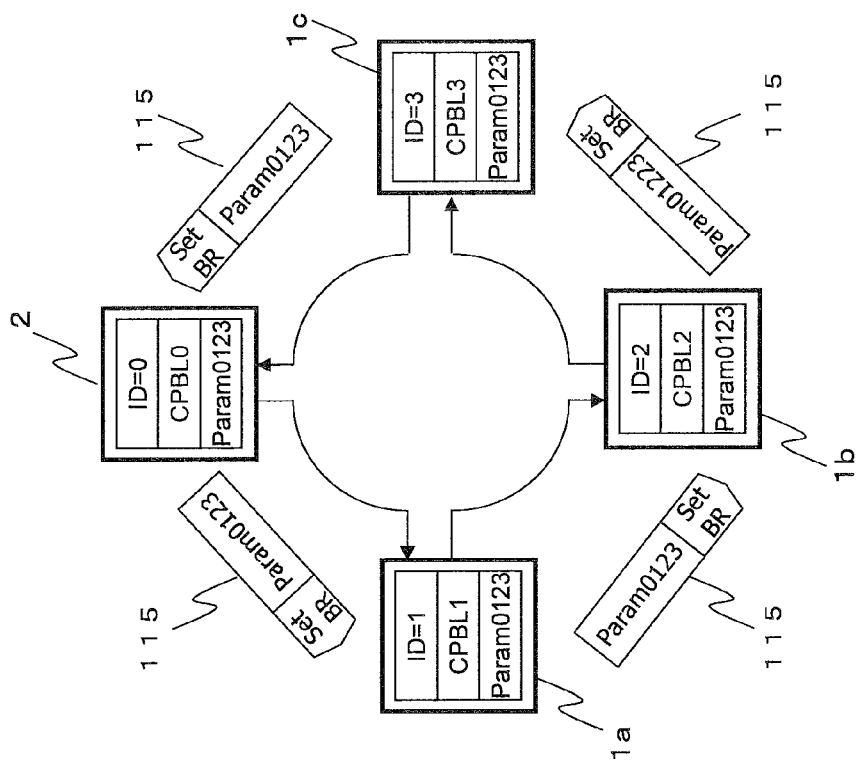
FIG. 11B (a)
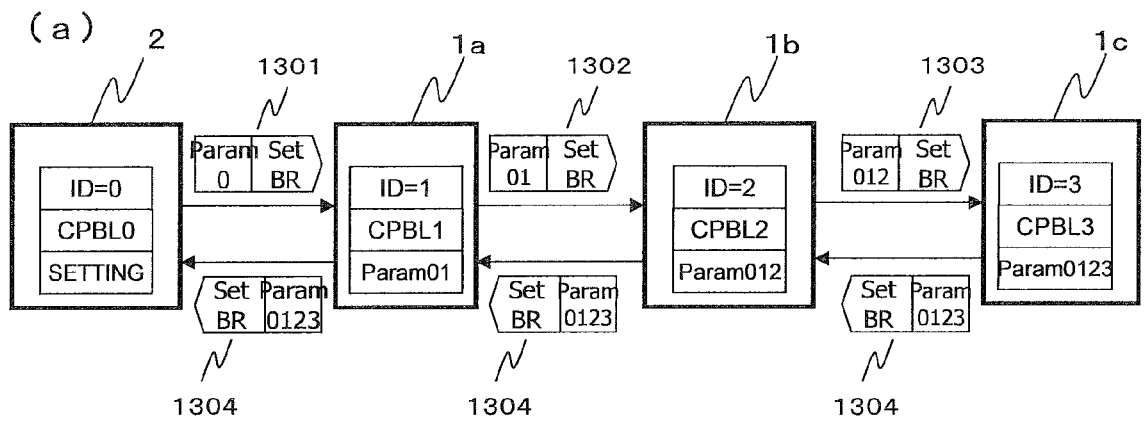
(b-1) Param0 ≠ Param0123
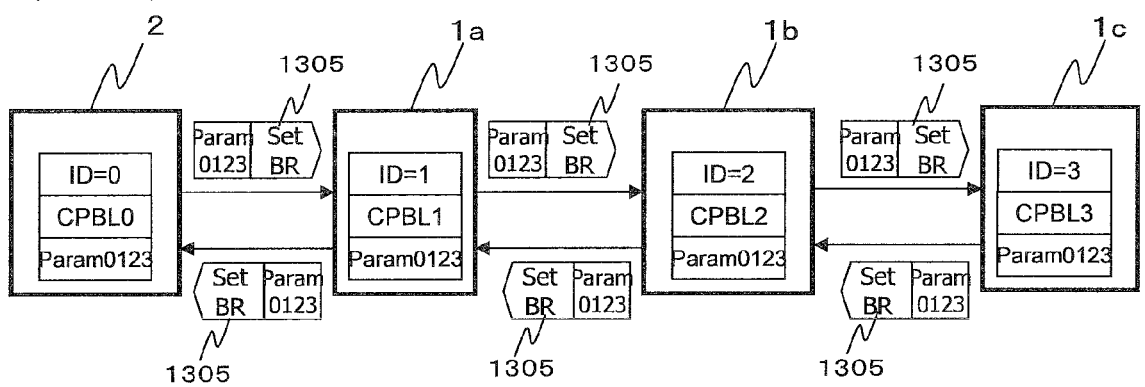
(b-2) Param0 = Param0123
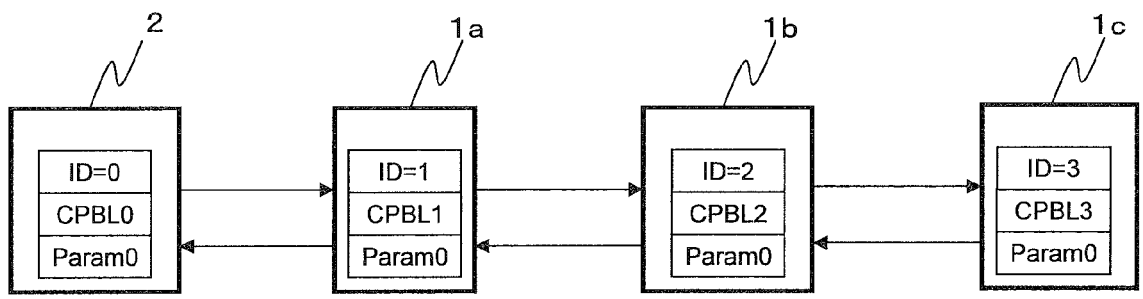
FIG. 13

# MASTER AND SLAVE SYSTEM WHEREIN MASTER INTERFACE UNIT COMPARES PARAMETER FROM PAYLOAD OF PARAMETER OBTAINING COMMAND WITH COMMUNICATION CAPABILITY PARAMETER OF PARAMETER DISPLAY UNIT

TECHNICAL FIELD

The present invention relates to a communication system including a master device and one or more slave devices in which the master device generates commands and the slave devices transfer various information in response to the commands generated by the master device.

BACKGROUND ART

In a conventional communication system including a master device and one or more slave devices, the master device generates commands and the slave devices perform various communication processes in response to the commands. To communicate with the slave devices connected in this system, the master device is required to set the configuration of each slave device when the system is activated. The configuration process includes setting the parameters of the physical layer and the data link layer of each slave device.

For example, Patent Literature 1 describes a technique used in a communication system in which a plurality of slave devices are connected in a chain. In this communication system, the slave devices are activated to enter a mode in which they can return a received command to the master device in an initial state, and then the slave devices switch to a through-mode when receiving a command from the master device and returning the command to the master device.

Patent Literature 2 describes a technique used in another communication system. In the communication system, a master device transmits a connection request to a plurality of devices. The master device separately initializes each device that has transmitted a response to the connection request, and controls (sets) the initialized device to enter a sleep mode. The master device then transmits a connection request again to the device and waits for a response from the device.

CITATION LIST

Patent Literature

Patent Literature 1: Japanese Unexamined Patent Publication No. H11-136244
Patent Literature 2: Japanese Unexamined Patent Publication No. 2003-143157

SUMMARY

Technical Problem

With the conventional techniques described in Patent Literature 1 and Patent Literature 2, the master device is required to set parameters separately for each of the plurality of slave devices. In this case, the time required by the configuration process increases in proportion to the number of slave devices connected in the system. As a result, the time required to initialize the slave devices before the communication system starts operating increases accordingly.

To solve the above problems, it is an object of the present invention to provide a communication system including a master device and one or more slave devices in which the master device sets the parameters of the slave devices in an efficient manner, a master device forming such a communication system, and a slave device forming such a communication system.

Solution to Problem

A first aspect of the present invention provides a slave device included in a communication system in which communication is performed between a master device and one or more slave devices by transmitting and receiving a command and a response and a payload added to the command or the response. The slave device includes a master-device interface unit.

The master-device interface unit includes a parameter display unit and a parameter setting unit.

The parameter display unit stores a communication capability parameter indicating a communication capability of the slave device. The parameter setting unit stores a communication setting parameter used to communicate with the master device.

When receiving, as a broadcast command to be received by all the slave devices that are connected in the communication system in a communicable manner, a parameter setting command for setting a parameter to be used by the parameter setting unit, (1) the master-device interface unit sets the communication setting parameter of the parameter setting unit based on a value of a payload added to the received parameter setting command, and (2) transmits a parameter setting command to which a payload storing a value of the set communication setting parameter of the parameter setting unit has been added.

The communication system including this slave device performs a configuration process using a broadcast command. In this communication system, the number of commands to be generated by the master device is fixed irrespective of the number of slave devices connected in the system. As a result, the communication system enables the configuration process of all the slave devices to be performed using a smaller number of commands. This shortens the initialization time of the slave devices.

A second aspect of the present invention provides the slave device of the first aspect of the present invention in which the master-device interface unit sets a parameter stored in the payload added to the received parameter setting command as the parameter to be used by the parameter setting unit.

A third aspect of the present invention provides the slave device of the first or second aspect of the present invention in which when receiving a parameter obtaining command as a broadcast command to be received by all the slave devices that are connected in the communication system in a communicable manner, the master-device interface unit transmits a parameter obtaining command to which a payload generated based on the payload added to the received parameter obtaining command has been added.

This slave device sets the parameter value of the communication setting parameter stored by the parameter setting unit using the value based on the payload added to the received parameter obtaining command, and transmits a command (a parameter obtaining command) to which a payload storing the set value has been added.

A fourth aspect of the present invention provides the slave device of the third aspect of the present invention in which the master-device interface unit compares a parameter value stored in the payload added to the received parameter obtaining command with a parameter value of the communication capability parameter stored by the parameter display unit, and sets a smaller one of the parameter values into the payload to be added to the parameter obtaining command and transmits the parameter obtaining command to which the payload storing the smaller value has been added.

This slave device sets the parameter value of the communication setting parameter stored by the parameter setting unit using a value indicating the lower communication capability, and transmits a command (a parameter obtaining command) to which a payload storing the set value has been added.

The comparison between the parameter value stored in the payload added to the parameter obtaining command and the parameter value of the communication capability parameter includes (1) comparison between all parameter values stored in the payload and the corresponding parameter values of all the communication capability parameters, and (2) comparison between only some of the parameter values stored in the payload and the corresponding parameter values of some of the communication capability parameters.

A fifth aspect of the present invention provides the slave device of the third aspect of the present invention in which the master-device interface unit compares a parameter value stored in the payload added to the received parameter obtaining command with a parameter value of the communication capability parameter stored by the parameter display unit, and sets one of the parameter values indicating a longer time into the payload to be added to the parameter obtaining command and transmits the parameter obtaining command to which the payload storing the value indicating the longer time has been added.

This slave device sets the parameter value of the communication setting parameter stored by the parameter setting unit using a value indicating the lower communication capability, and transmits a command (a parameter obtaining command) to which a payload storing the set value has been added.

The comparison between the parameter value stored in the payload added to the parameter obtaining command and the parameter value of the communication capability parameter includes (1) comparison between all parameter values stored in the payload and the corresponding parameter values of all the communication capability parameters, and (2) comparison between only some of the parameter values stored in the payload and the corresponding parameter values of some of the communication capability parameters.

A sixth aspect of the present invention provides a master device included in a communication system in which communication is performed between a master device and one or more slave devices using a command and a response. The master device includes a slave-device interface unit that transmits a command to the one or more slave devices and performs communication by receiving a command or a response from the one or more slave devices.

The slave-device interface unit includes a parameter display unit and a parameter setting unit.

The parameter display unit stores a communication capability parameter indicating a communication capability of the master device. The parameter setting unit stores a communication setting parameter used to communicate with the one or more slave devices.

The slave-device interface unit transmits, as a broadcast command to be received by all the slave devices that are connected in the communication system in a communicable manner, a parameter setting command for setting a communication setting parameter used to communicate with the one or more slave devices as a parameter to be used by a parameter setting unit included in each slave device.

This master device transmits, as a broadcast command to be received by all the slave devices that are connected in the communication system in a communicable manner, a parameter setting command for setting a communication setting parameter used to communicate with the one or more slave devices as a parameter to be used by a parameter setting unit included in each slave device. The communication system including this master device performs a configuration process using a broadcast command. In this communication system, the number of commands to be generated by the master device is fixed irrespective of the number of slave devices connected in the system. As a result, the communication system enables the configuration process of all the slave devices to be performed using a smaller number of commands. This shortens the initialization time of the slave devices.

(1) The slave-device interface unit may transmit a parameter setting command to which a payload storing at least a part of the communication capability parameter stored by the parameter display unit of the master device has been added.

In this case, the communication system including this master device enables a configuration process to be performed in a reliable manner for each predetermined communication capability parameter value.

(2) The slave-device interface unit may transmit a parameter setting command to which a payload storing a parameter satisfied by both the master device and the one or more slave devices has been added.

In this case, the communication system including this master device enables information about a parameter indicating the lowest communication capability among the master device and the one or more slave devices to be transmitted to each slave device.

(3) The slave-device interface unit may transmit, as a broadcast command, a parameter setting command for obtaining a communication capability parameter stored in the parameter display units of the one or more slave devices before transmitting a parameter setting command.

This master device transmits a parameter setting command after transmitting a parameter obtaining command as a broadcast command and receiving information about the communication capability of each slave device. In the communication system including this master device, the master device transmits a parameter setting command, and each slave device sets, based on the transmitted parameter setting command, a parameter value corresponding to the communication capability satisfied by the master device and each slave device as a parameter to be used by the slave device. More specifically, the communication system including this master device enables a configuration process to be performed while requiring only a smaller number of commands (parameter obtaining commands and parameter setting commands) to be generated.

(4) The payload added to the parameter obtaining command may include at least a part of the communication capability parameter stored by the parameter display unit of the master device.

This enables the master device to determine (obtain) the parameter value of the communication capability parameter set to be used by each slave device for at least a part of the communication capability parameter stored by the parameter display unit of the master device.

(5) The payload added to the parameter setting command may include a parameter value obtained using a parameter obtaining command.

This enables the master device to transmit, to each slave device, a parameter setting command including a parameter value considering the communication capability of each slave device determined (obtained) by transmitting a parameter obtaining command.

A seventh aspect of the present invention provides a communication system in which communication is performed between a master device and one or more slave devices by transmitting and receiving a command and a response and a payload added to the command or the response. The system includes a master device and one or more slave devices.

The master device includes a parameter display unit and a parameter setting unit.

The parameter display unit stores a communication capability parameter indicating a communication capability of the master device. The parameter setting unit stores a communication setting parameter used to communicate with the one or more slave devices.

The master device transmits, as a broadcast command to be received by all the slave devices that are connected in the communication system in a communicable manner, a parameter setting command for setting a communication setting parameter used to communicate with the one or more slave devices as a parameter to be used by a parameter setting unit included in each slave device.

Each of the one or more slave devices includes a parameter display unit and a parameter setting unit.

The parameter display unit stores a communication capability parameter indicating a communication capability of the slave device. The parameter setting unit stores a communication setting parameter used to communicate with the master device.

When each of the slave devices receives, as a broadcast command to be received by all the slave devices that are connected in the communication system in a communicable manner, a parameter setting command for setting a parameter to be used by the parameter setting unit of the slave device, (1) the slave device sets the communication setting parameter of the parameter setting unit of the slave device based on a value of a payload added to the received parameter setting command, and (2) transmits a parameter setting command to which a payload storing a value of the set communication setting parameter of the parameter setting unit has been added.

This communication system performs a configuration process using a broadcast command. In this communication system, the number of commands to be generated by the master device is fixed irrespective of the number of slave devices connected in the system. As a result, the communication system enables the configuration process of all the slave devices to be performed using a smaller number of commands. This shortens the initialization time of the slave devices.

An eighth aspect of the present invention provides the communication system of the seventh aspect of the present invention in which the payload added to the parameter setting command includes at least a part of the communication capability parameter stored by the parameter display unit of the master device.

A ninth aspect of the present invention provides the communication system of the seventh aspect of the present invention in which the payload added to the parameter setting command includes a parameter satisfied by both the master device and the one or more slave devices.

A tenth aspect of the present invention provides the communication system of the seventh aspect of the present invention in which the slave device sets a parameter value of the communication setting parameter of the parameter setting unit of the slave device based on a parameter stored in the payload added to the received parameter setting command.

Setting a parameter value of the communication setting parameter of the parameter setting unit of the slave device based on a parameter stored in the payload added to the received parameter setting command includes setting a parameter value of the communication setting parameter of the parameter setting unit of the slave device directly to a parameter value stored in the payload added to the received parameter setting command, and also includes setting a parameter value of the communication setting parameter using directly a value of the payload added to the received parameter setting command as the communication setting parameter stored by the parameter setting unit.

An eleventh aspect of the present invention provides the communication system of one of the seventh to tenth aspects of the present invention in which the master device transmits a parameter obtaining command for obtaining the communication capability parameter stored by the parameter display unit of the one or more slave devices as the broadcast command before transmitting the parameter setting command.

A twelfth aspect of the present invention provides the communication system of the eleventh aspect of the present invention in which the payload added to the parameter obtaining command includes at least a part of the communication capability parameter stored by the parameter display unit of the master device.

A thirteenth aspect of the present invention provides the communication system of the eleventh aspect of the present invention in which the payload added to the parameter setting command includes a parameter value obtained using the parameter obtaining command.

A fourteenth aspect of the present invention provides the communication system of the eleventh aspect of the present invention in which when receiving the parameter obtaining command as the broadcast command, the slave device transmits a parameter obtaining command to which a payload generated based on the payload added to the received parameter obtaining command has been added.

A fifteenth aspect of the present invention provides the communication system of the fourteenth aspect of the present invention in which a master-device interface unit included in the slave device compares a parameter value stored in the payload added to the received parameter obtaining command with a parameter value of the communication capability parameter stored by the parameter display unit, and sets a smaller one of the parameter values into the payload to be added to the parameter obtaining command and transmits the parameter obtaining command to which the payload storing the smaller value has been added.

The comparison between the parameter value stored in the payload added to the parameter obtaining command and the parameter value of the communication capability parameter includes (1) comparison between all parameter values stored in the payload and the corresponding parameter values of all the communication capability parameters, and (2) comparison between only some of the parameter values stored in the payload and the corresponding parameter values of some of the communication capability parameters.

A sixteenth aspect of the present invention provides the communication system of the fourteenth aspect of the present invention in which a master-device interface unit included in the slave device compares a parameter value stored in the payload added to the received parameter obtaining command with a parameter value of the communication capability parameter stored by the parameter display unit, and sets one of the parameter values indicating a longer time into the payload to be added to the parameter obtaining command and transmits the parameter obtaining command to which the payload storing the value indicating the longer time has been added.

The comparison between the parameter value stored in the payload added to the parameter obtaining command and the parameter value of the communication capability parameter includes (1) comparison between all parameter values stored in the payload and the corresponding parameter values of all the communication capability parameters, and (2) comparison between only some of the parameter values stored in the payload and the corresponding parameter values of some of the communication capability parameters.

A seventeenth aspect of the present invention provides the communication system of one of the seventh to sixteenth aspects of the present invention in which the master device and the one or more slave devices are connected using a ring topology.

An eighteenth aspect of the present invention provides the communication system of one of the seventh to sixteenth aspects of the present invention in which the master device and the one or more slave devices are connected using a hub topology.

Advantageous Effects

The present invention provides a communication system in which a master device sets the parameters of a plurality of slave devices in an efficient manner using a smaller number of commands, a master device forming such a communication system, and a slave device forming such a communication system.

BRIEF DESCRIPTION OF DRAWINGS

FIG. 4 is a diagram describing a command/response transmission and reception process performed in a point-to-point topology.

FIG. 8 is a diagram describing the structure of a parameter display unit and a parameter setting unit.

FIG. 11B is a diagram describing communication in which parameters transmitted by a master device and parameters received by the master device are different or the same.

FIG. 13 is a diagram describing a second configuration process performed in a chain topology.

REFERENCE SIGNS LIST

Figure 1:
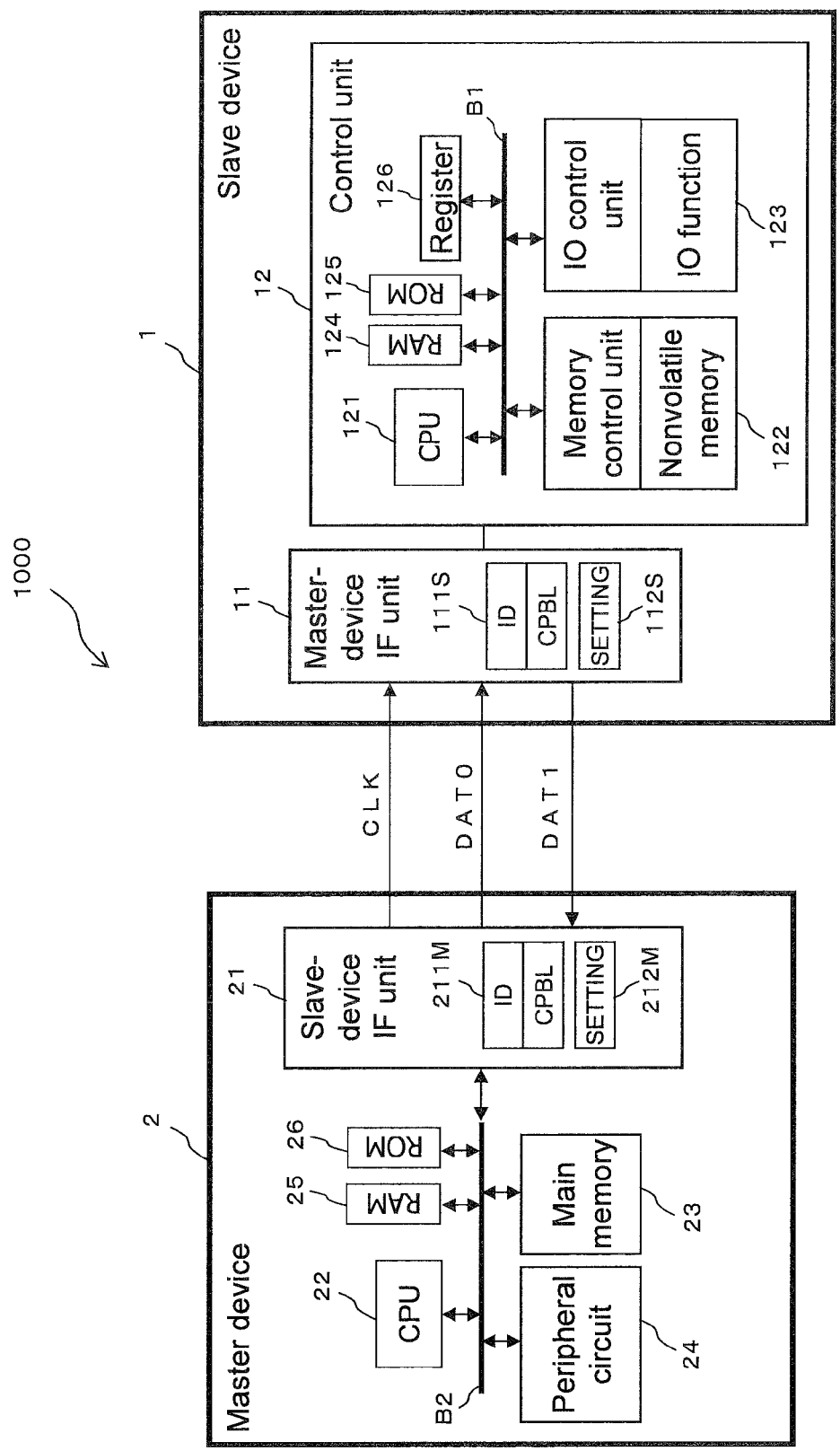
FIG. 1 is a schematic diagram showing the structure of a communication system 1000 according to a first embodiment of the present invention.

1000 communication system
1, 1*a*, 1*b*, 1*c* slave device
2 master device
3 hub
11 master-device IF unit
21 slave-device IF unit
22 CPU
23 main memory
24 peripheral circuit
81 parameter display unit
82 parameter setting unit 122 memory unit
123 IO unit
111S parameter display unit (slave device)
112S parameter setting unit (slave device)
211M parameter display unit (master device)
212M parameter setting unit (master device)

DESCRIPTION OF EMBODIMENTS

Embodiments of the present invention will now be described with reference to the drawings. The same components are given the same reference symbols or numerals unless otherwise specified.

First Embodiment 1.1 Structure of Communication System

FIG. 1 is a block diagram showing the structure of a communication system 1000 according to a first embodiment of the present invention.

As shown in FIG. 1, the communication system 1000 of the present embodiment includes a master device 2 and a slave device 1. The master device 2 and the slave device 1 are connected to each other with a clock line CLK, a signal line DAT0, and a signal line DAT1. The signal line DAT0 is used to transmit data from the master device 2 to the slave device 1. The signal line DAT1 is used to transmit data from the slave device 1 to the master device 2. The clock line CLK, the signal line DAT0, and the signal line DAT1 are used to transmit and receive commands, responses, and data to and from the master device 2 and the slave device 1. The components that are not essential to the present invention are not shown in the figure.

The lines CLK, DAT0, and DAT1 function as transmission paths for transmitting signals by differential signaling serial transmission or by single ended transmission. Signal lines for transmitting data should not be limited to the two lines (the lines DAT0 and DAT1) included in the transmission paths (CLK, DAT0, and DAT1) of the communication system 1000. Alternatively, more signal lines (for example four signal lines DAT0 to DAT3 or signal lines DAT0 to DAT7) may be used. The use of more signal lines increases the communication speed of the communication system 1000. The number of signal lines for transmitting data from the master device 2 to the slave device 1 and the number of signal lines for transmitting data from the slave device 1 to the master device may be the same or may be different.

The communication system 1000 may use (1) a point-to-point topology in which a single master device is connected to a single slave device, or (2) a point-to-multipoint topology in which a single master device is connected to a plurality of slave devices. Examples of the point-to-multipoint topology of the communication system 1000 include (1) a ring topology, (2) a chain topology (daisy chain topology), and (3) a hub topology.

1.1.1 Structure of Master Device

As shown in FIG. 1, the master device 2 includes a CPU 22, a ROM 26, a RAM 25, a main memory unit 23, a peripheral circuit 24, and a slave-device IF unit 21. The CPU 22 controls the overall operation of the master device 2. These functional units of the master device 2 may be connected with a bus B2 as shown in FIG. 1. Alternatively, some or all of the functional units of the master device 2 may be directly connected to each other.

The functional units of the master device 2 may be formed using the same semiconductor LSI (large scale integration) circuit, or some or all of the functional units of the master device 2 may be formed using different semiconductor LSI circuits. Alternatively, the functional units of the master device 2 may be formed by combining hardware and software.

The slave-device IF unit 21 communicates with the slave device 1 using the clock line CLK, the signal line DAT0, and the signal line DAT1. The slave-device IF unit 21 includes a parameter display unit 211M and a parameter setting unit 212M. The parameter display unit 211M stores an identifier (ID) of the master device 2 and communication capability parameters CPBL of the master device 2. The parameter setting unit 212M stores setting parameters (SETTING) that are used to communicate with the slave device 1.

The communication setting parameters SETTING are information that can be updated and are set through negotiation with the slave device 1. The values of the communication setting parameters SETTING are stored in a register or a memory.

The ID and the communication capability parameters CPBL of the master device 2 may be fixed values stored in a memory such as the ROM 26, or may be values stored in a register or a memory that can be set by the CPU 22. Alternatively, the ID and the communication capability parameters CPBL of the master device 2 may be set by other means. For example, the ID and the communication capability parameters CPBL of the master device 2 may be set through an external terminal. Hereafter, the ID and the communication capability parameters CPBL of the master device 2 that have been set by certain means are used.

1.1.2 Structure of Slave Device

As shown in FIG. 1, the slave device 1 includes a master-device IF unit 11 and a control unit 12.

The control unit 12 includes a CPU 121, a ROM 125, a RAM 124, a memory unit 122, and an IO unit 123. The memory unit 122 includes a nonvolatile memory and a memory control unit. The IO unit 123 has the IO function and includes an IO control unit.

The functional units of the control unit 12 included in the slave device 1 may be connected with a bus B1 as shown in FIG. 1. Alternatively, some or all of the functional units of the slave device 1 may be directly connected to each other.

The functional units of the control unit 12 and/or the master-device IF unit 11 of the slave device 1 may be formed using the same semiconductor LSI circuit, or some or all of the functional units of the control unit 12 and/or the master-device IF unit 11 of the slave device 1 may be formed using different semiconductor LSI circuits. Alternatively, the functional units of the control unit 12 and/or the master-device IF unit 11 of the slave device 1 may be formed by combining hardware and software.

The slave device 1 may not include the memory unit 122 and/or the IO unit 123.

The master-device IF unit 11 communicates with the master device 2 using the clock line CLK, the signal line DAT0, and the signal line DAT1. The master-device IF unit 11 includes a parameter display unit 111S and a parameter setting unit 112S. The parameter display unit 111S stores an identifier (ID) of the slave device 1 and communication capability parameters CPBL of the slave device 1. The parameter setting unit 112S stores setting parameters (SETTING) that are used to communicate with the master device 2.

The communication setting parameters SETTING are information that can be updated and are set through negotiation with the master device 2. The values of the communication setting parameters SETTING are stored in a register or a memory. The ID and the communication capability parameters CPBL of the slave device 1 may be fixed values stored in the ROM 125, or may be values stored in a register or a memory that can be set by the CPU 121. Alternatively, the ID and the communication capability parameters CPBL of the slave device 1 may be set by other means. For example, the ID and the communication capability parameters CPBL of the slave device 1 may be set through an external terminal. Hereafter, the ID and the communication capability parameters CPBL of the slave device 1 that have been set by certain means are used.

The slave device 1 may be connected to a single set of a clock line CLK, a signal line DAT0, and a signal line DAT1 (three transmission paths), or may be connected to two sets of clock lines CLK, signal lines DAT0, and signal lines DAT1 (six (3*2) transmission paths) in a chain topology (described later) of the slave device 1.

In the communication system 1000 shown in FIG. 1, the clock line CLK is formed by a terminal different from the terminals forming the signal line DAT0 and the signal line DAT1. The present invention should not be limited to this structure. For example, the communication system 1000 may use an embedded clock, which is a clock embedded in a signal line. In this case, the CLK terminal of the slave device 1 and the CLK terminal of the master device 2 and the clock line CLK are eliminated from the communication system 1000.

1.1.3 Connection Between Master Device and Slave Device

Figure 2:
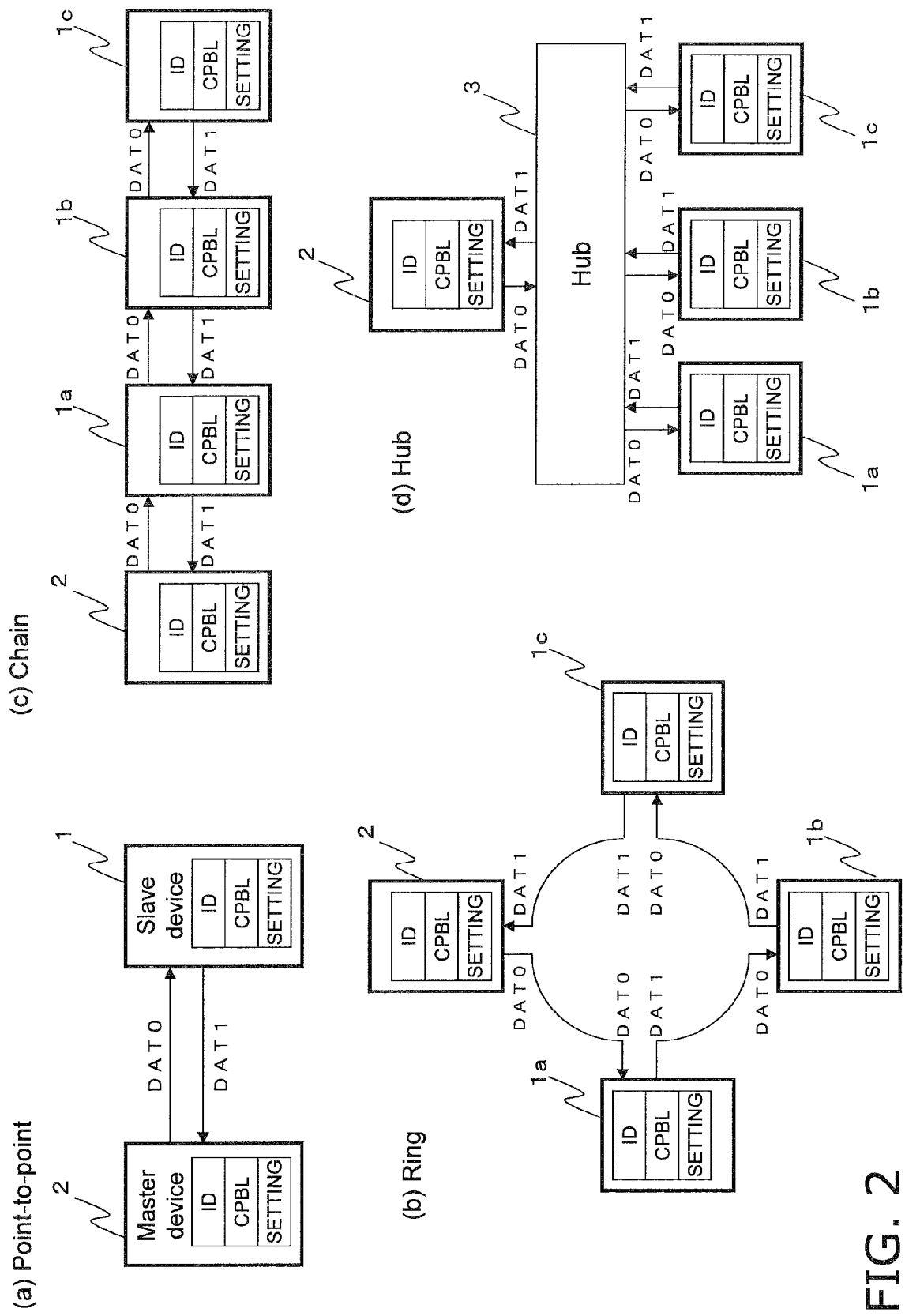
FIG. 2 is a diagram describing the topologies used to connect a master device and slave devices (a slave device).

FIG. 2 is a diagram describing connection between the master device 2 and the slave device(s) 1. The communication system 1000 of the present embodiment includes a single master device and one or more slave devices, which can be connected in a variety of manners.

FIGS. 2(*a*) to 2(*d*) each show connection between the master device 2 and the slave device(s) 1. More specifically, FIG. 2(*a*) shows a point-to-point topology in which a master device 2 is connected to a single slave device 1. FIGS. 2(*b*) to 2(*d*) each show a point-to-multipoint structure (topology) in which a master device 2 is connected to a plurality of slave devices 1*a* to 1*c*. More specifically, FIG. 2(*b*) shows a ring topology, FIG. 2(*c*) shows a chain topology, and FIG. 2(*d*) shows a hub topology.

In any of these topologies, the master device 2 outputs data DAT0 and receives input data DAT1, and the slave device 1 receives input data DAT0 and outputs data DAT1. Only in the chain topology shown in FIG. 2(*c*), each slave device needs to transmit a signal to its subsequent slave device and has a signal line for outputting data DAT0 and a signal line for receiving input data DAT1. Although the clock line CLK is not shown in FIG. 2, the master device may be connected to each slave device using an independent terminal forming the clock line CLK in this communication system. An embedded clock may be used to eliminate the clock line CLK from this communication system.

1.2 Operation of Communication System

The operation of the communication system 1000 with the above-described structure will now be described.

1.2.1 Format of Command and Response

Figure 3A:
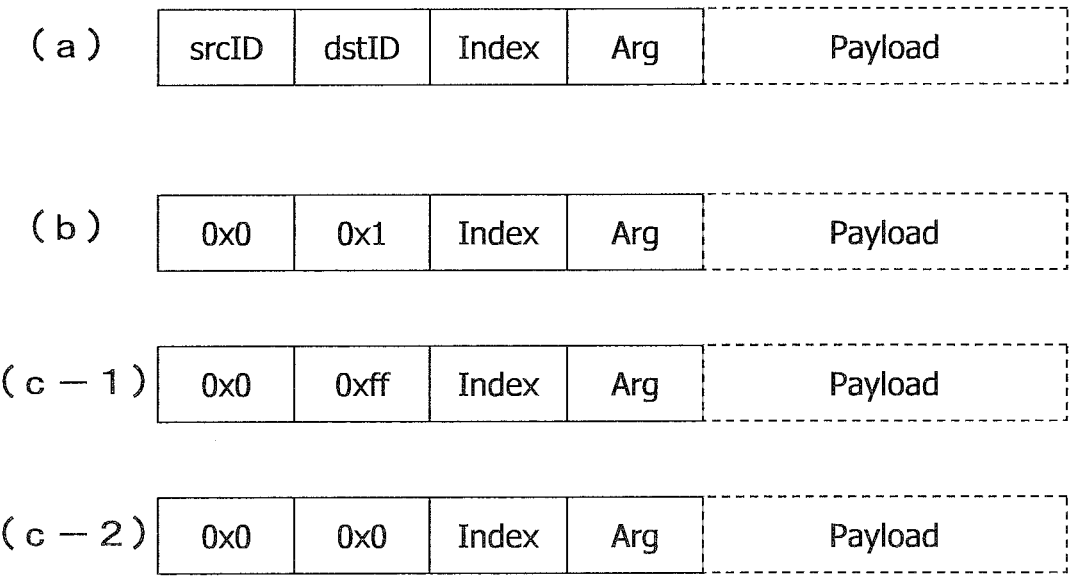
FIG. 3A is a diagram describing the format of a command or a response.

FIG. 3A shows an example of the format of a command or a response used in communication performed between the master device 2 and the slave device(s) 1 included in the communication system 1000 of the present embodiment.

As shown in FIG. 3A(a), the command or the response includes (1) srcID, which is an ID of a source device that has transmitted the command or the response, (2) dstID, which is an ID of a destination device to which the command or the response is to be transmitted, (3) Index, which indicates the type of the command or the response, and (4) Arg, which indicates various arguments of the command or the response.

A payload (Payload) storing data associated with the command or the response may be added to the command or the response. The command or the response may include only some of srcID, dstID, Index, Arg, and Payload, or the command may additionally include other information.

The command and the response may have the same format, or may have different formats.

Although the packet actually includes a start symbol and an end symbol defined in accordance with the communication protocol and an error detection and correction code, these elements that are not directly pertinent to the present invention are not shown in the figures.

FIG. 3A(b) shows an example of the format of a device-specific command that is to be transmitted from the master device 2 to a specific slave device 1. In the command (or response) shown in FIG. 3A(b), srcID is 0x0 and dstID is 0x1. This command (or response) is to be transmitted from the device whose ID is 0x0 to the device whose ID is 0x1.

The master device 2 and the slave device(s) 1 can also transmit a broadcast command so that all the devices receive the same command. The format of such a broadcast command is shown in FIGS. 3A(c-1) and 3A(c-2). The broadcast command may be set (defined) in the manners (1) to (3) below.

(1) The value of dstID is set using a specific value (0xff in FIG. 3A(c1)) to indicate (define) that the command is a broadcast command.

In the example shown in FIG. 3A(c1), a command whose dstID is 0xff is set (defined) as a broadcast command. In the command example shown in FIG. 3A(c1), dstID is 0xff. Thus, the command shown in FIG. 3A(c1) is a broadcast command.

(2) The values of srcID and dstID are set the same to indicate (define) that the command is a broadcast command.

In the example shown in FIG. 3A(c2), a command whose srcID and dstID are the same value (0x0) is set (defined) as a broadcast command.

(3) Index or Arg is accompanied by an identifier or a flag indicating that the command is a broadcast command. The identifier value or the flag value is set using a predetermined value to indicate (define) that the command is a broadcast command.

Figure 3B:
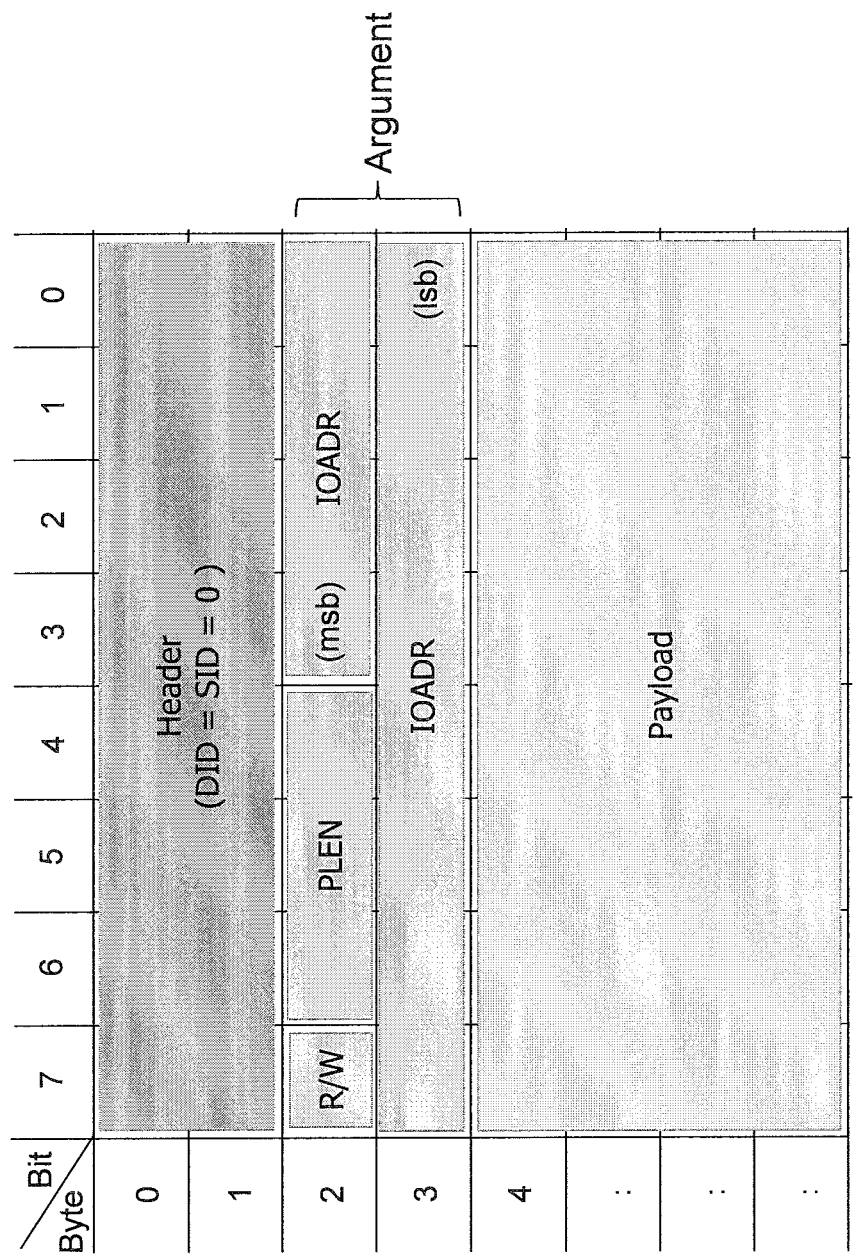
FIG. 3B shows an example of the format of a command or a response.

FIG. 3B shows a specific example (an example) of the format of a command set in the manner (2) described above.

In the command format shown in FIG. 3B, the first two bytes (byte 0 and byte 1) form a header, and the following two bytes (byte 2 and byte 3) form arguments (Argument), and the following bytes form a payload.

The command is set as a broadcast command by setting the values srcID and dstID to the same value (0x0) in the header.

In the command format, R/W (bit 7 of byte 2) indicates the type of the command, or specifically indicates whether the command is for data writing or for data reading. When R/W=0, the command is for data reading. When R/W=1, the command is for data writing.

In the command format, IOADR indicates an address of a register space or a memory space from which or to which data is to be read or to be written. The address set as IOADR may not necessarily be an absolute address but may be a relative address. The address set as IOADR may be a byte address, or an address in units of words (2 bytes) or an address in units of double words (four bytes). Alternatively, the address may be in units of 512-byte blocks.

A register used for a configuration process (hereafter referred to as a "configuration register") will now be described.

The slave device 1 has configuration registers, which are used for a configuration process. The configuration registers consist of registers of two different categories: (1) capability registers and (2) status/setting registers (which may simply be referred to as "setting registers").

The capability registers are used to store information associated with the communication capabilities and the communication performance of the slave device 1 to be set or to be referred to in the configuration process.

The status/setting registers are used to set and store values that are allocated to the slave device 1 through the configuration process or values obtained based on the present status (for example, the present communication status) of the slave device 1 (the present values stored in the registers).

Alternatively, the master device 2 may include some or all of the configuration registers that are included in the slave device 1. Hereafter, the master device 2 is assumed to have the same configuration registers as the slave device 1.

The addresses defined for each configuration register are assumed to be continuous in the address space common to the master device and the slave device(s).

Figure 3C:
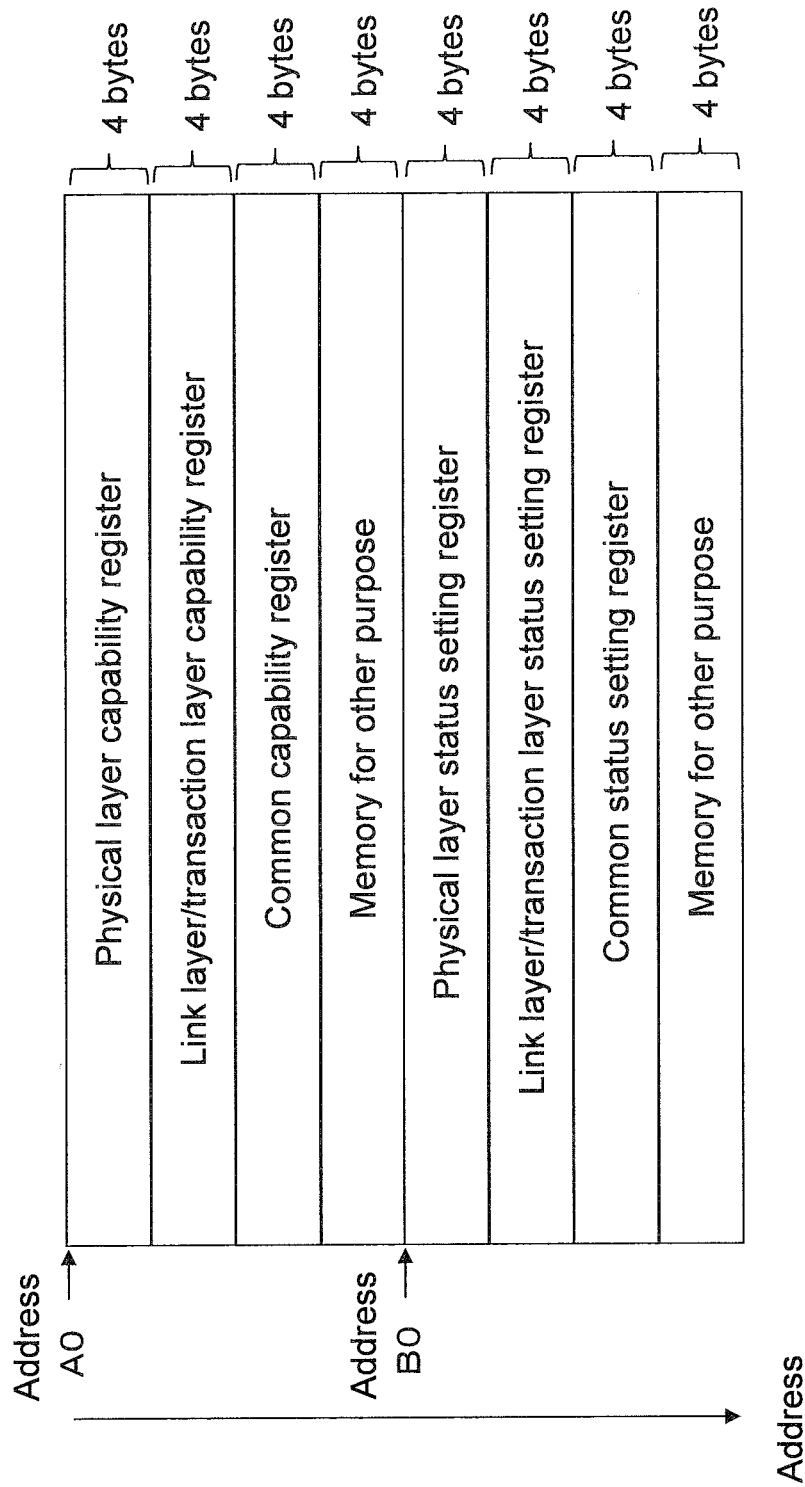
FIG. 3C is a diagram describing a configuration register map (a first example).

FIG. 3C shows an example (first example) of an address space map of configuration registers (a map for configuration registers). In the configuration register map shown in FIG. 3C, each register consists of four bytes. In the address space shown in FIG. 3C, for example, a physical layer capability register is formed using four bytes from address A0, a link layer/transaction layer capability register is formed using the following four bytes, a common capability register is formed using the following four bytes, and a memory space for other purpose (reserve for example) is formed using the following four bytes. In the address space shown in FIG. 3C, a physical layer status/setting register is formed using four bytes from address B0, a link layer/transaction layer status/setting register is formed using the following four bytes, a common status/setting register is formed using the following four bytes, and a memory space for other purpose (reserve for example) is formed using the following four bytes.

PLEN (bits 4 to 6 of byte 2 (PLEN may be expressed using two-bit data consisting of bit 4 and bit 5 of byte 2) indicates the length of a payload. For example, the length of the payload may be set in the manner described below.

When PLEN=0, the payload has a length of zero byte.
When PLEN=1, the payload has a length of four bytes.
This setting causes data to be read from and written to a single register (a four-byte register).
When PLEN=2, the payload has a length of eight bytes.
This setting causes data to be read from and written to two registers.
When PLEN=3, the payload has a length of 16 bytes.
This setting causes data to be read from and written to four registers.

In the above command format, the setting may be such that R/W=0, IOADR is a value corresponding to address A0 shown in FIG. 3C, and PLEN=1. This generates a parameter obtaining command (Inq BR) for reading (obtaining) a single register (a physical layer capability register). Alternatively, the setting may be such that PLEN=2. This generates a parameter obtaining command (Inq BR) as a broadcast command for reading (obtaining) two registers (a physical layer capability register and a link layer/transaction layer capability register).

In the above command format, the setting may also be such that R/W=1, IOADR is a value corresponding to address A0 shown in FIG. 3C, and PLEN=1. This generates a parameter obtaining command (Set BR) for writing (setting) data (payload data) to a single register (physical layer capability register). Alternatively, the setting may be such that PLEN=2. This generates a parameter obtaining command (Set BR) for writing (setting) data (payload data) to two registers (a physical layer capability register and a link layer/transaction layer capability register).

Figure 3D:
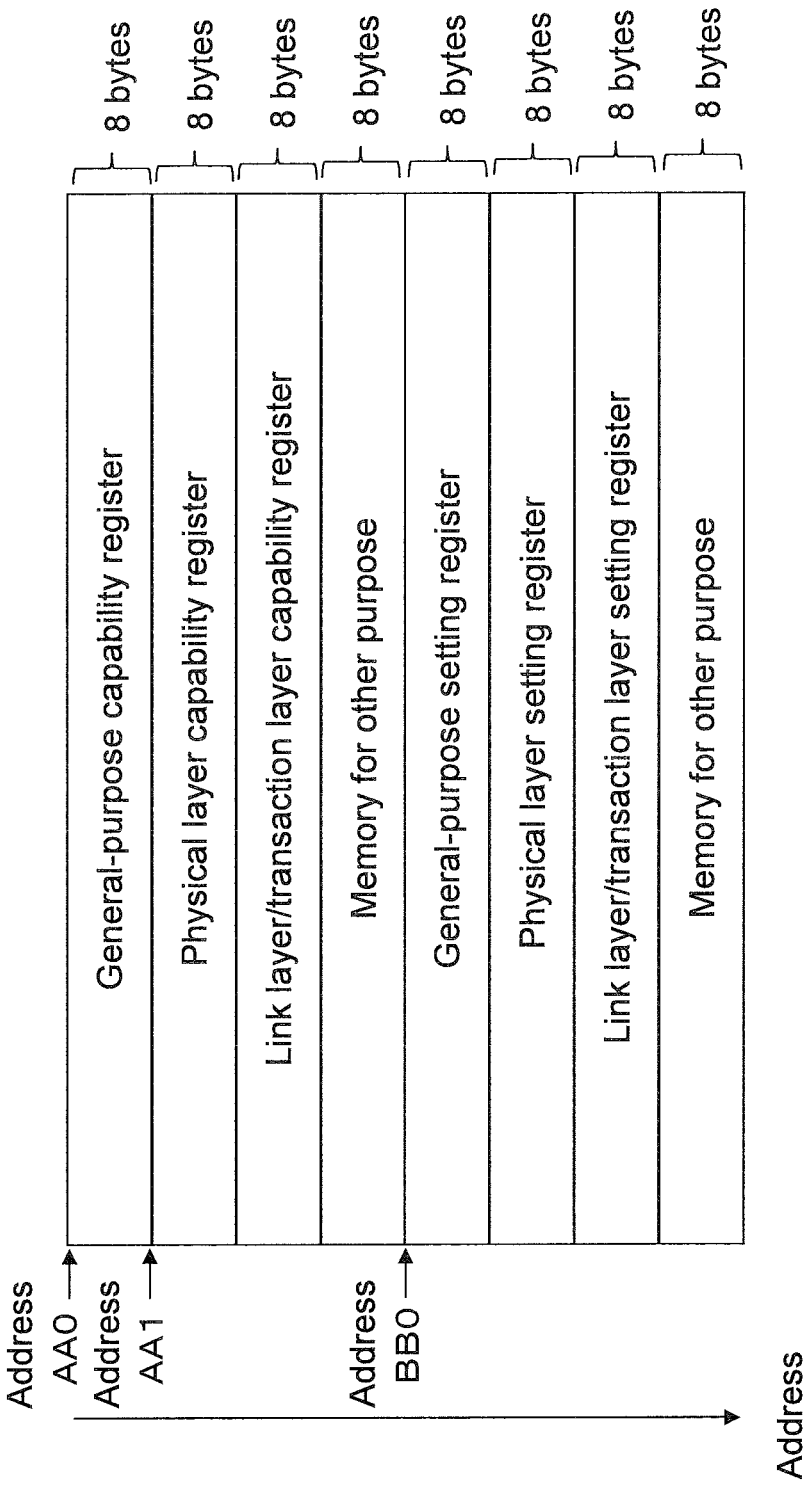
FIG. 3D is a diagram describing a configuration register map (a second example).

FIG. 3D shows another example (second example) of the address space map for configuration registers (the map for configuration registers). In the configuration register map shown in FIG. 3D, each register consists of eight bytes. In the address space shown in FIG. 3D, for example, a physical layer capability register is formed using eight bytes from address AA0, a link layer/transaction layer capability register is formed using the following eight bytes, a common capability register is formed using the following eight bytes, and a memory space for other purpose (reserve for example) is formed using the following eight bytes. In the address space shown in FIG. 3D, a general-purpose setting register is formed using eight bytes from address BB0, a physical layer setting register is formed using the following eight bytes, a physical layer setting register is formed using the following eight bytes, a physical layer setting register is formed using the following eight bytes, and a memory space for other purpose (reserve for example) is formed using the following eight bytes.

PLEN (bits 4 to 6 of byte 2 (PLEN may be expressed using two-bit data consisting of bit 4 and bit 5 of byte 2) indicates the length of a payload. For example, the length of the payload may be set in the manner described below.

When PLEN=0, the payload has a length of zero byte.
When PLEN=1, the payload has a length of four bytes.
When PLEN=2, the payload has a length of eight bytes.
This setting causes data to be read from and written to a single register (an eight-byte register).
When PLEN=3, the payload has a length of 16 bytes.
This setting causes data to be read from and written to two registers (two eight-byte registers).

In the above command format, the setting may be such that R/W=0, IOADR is a value corresponding to address AA1 shown in FIG. 3D, and PLEN=2. This generates a parameter obtaining command (Inq BR) for reading (obtaining) a single register (a physical layer capability register). Alternatively, the setting may be such that PLEN=3. This generates a parameter obtaining command (Inq BR) as a broadcast command for reading (obtaining) two registers (a physical layer capability register and a link layer/transaction layer capability register).

In the above command format, the setting may also be such that R/W=1, IOADR is a value corresponding to address AA1 shown in FIG. 3D, and PLEN=2. This generates a parameter setting command (Set BR) for writing (setting) data (payload data) to a single register (a physical layer capability register). Alternatively, the setting may be such that PLEN=3. This generates a parameter setting command (Set BR) for writing (setting) data (payload data) to two registers (a physical layer capability register and a link layer/transaction layer capability register).

Unless otherwise specified, the ID referred to hereafter or shown in the figures intends to mean "dstID". For a broadcast command, srcID and dstID are also assumed to be set using appropriate values, which will not be described in detail. Other parameters that are not essential to the present invention will not be described in detail and are assumed to be set in an appropriate manner.

1.2.2 Command/Response Transmission and Reception

FIGS. 4(a) and 4(b) are diagrams describing transmission and reception of a command and a response in the communication system of the present embodiment having a pointto-point topology in which the master device 2 and the single slave device 1 are connected to each other.

FIG. 4(a) is a diagram describing communication performed using a device-specific command. As shown in FIG. 4(a), the master device 2 generates a command CMD ID whose dstID is set using an ID of a specific slave device 1, and transmits the command to the slave device 1. A payload may be added to the command depending on the type of the command. The slave device 1 receives the command from the master device 2, and transmits a response RES to the master device 2 in accordance with the received command, and performs processing required by the command. The response RES includes the ID of the master device 2. The slave device 1 may return the response after completing the processing required by the command. Although not shown, the slave device 1 may add a payload to the response RES depending on the type of the received command and transmit, to the master device 2, the response RES to which the payload has been added. When receiving the response RES to the command CMD ID that the master device 2 has transmitted, the master device 2 determines that the device-specific command has been received by the slave device 1.

FIG. 4(b) is a diagram describing communication performed using a broadcast command.

As shown in FIG. 4(b), the master device 2 transmits a broadcast command CMD BR to the slave device 1. A payload may be added to the command depending on the type of the command. The slave device 1 receives the command from the master device 2, and transmits the same command as the received command to the master device 2. The slave device 1 may perform processing based on the received command as well as the payload added to the command, and may add the processing result as a new payload Payload' to the command, or may output the received payload without changing. When receiving the command CMD BR that the master device 2 has transmitted, the master device 2 determines that the broadcast command has been received by the slave device 1. When determining that Payload' has been added to the received command, the master device 2 performs the processing based on the payload data.

Figure 5:
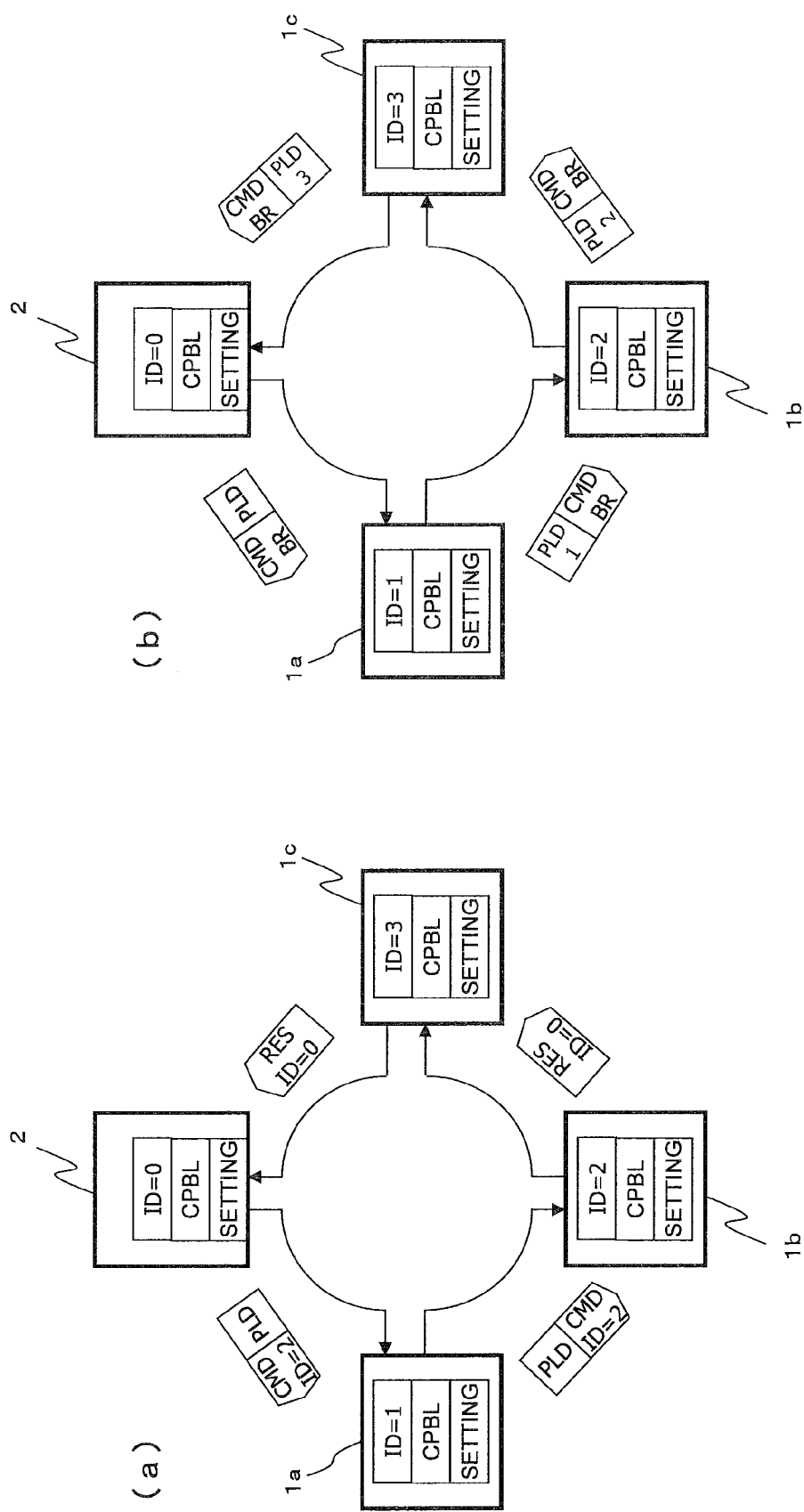
FIG. 5 is a diagram describing a command/response transmission and reception process performed in a ring topology.
Figure 6:
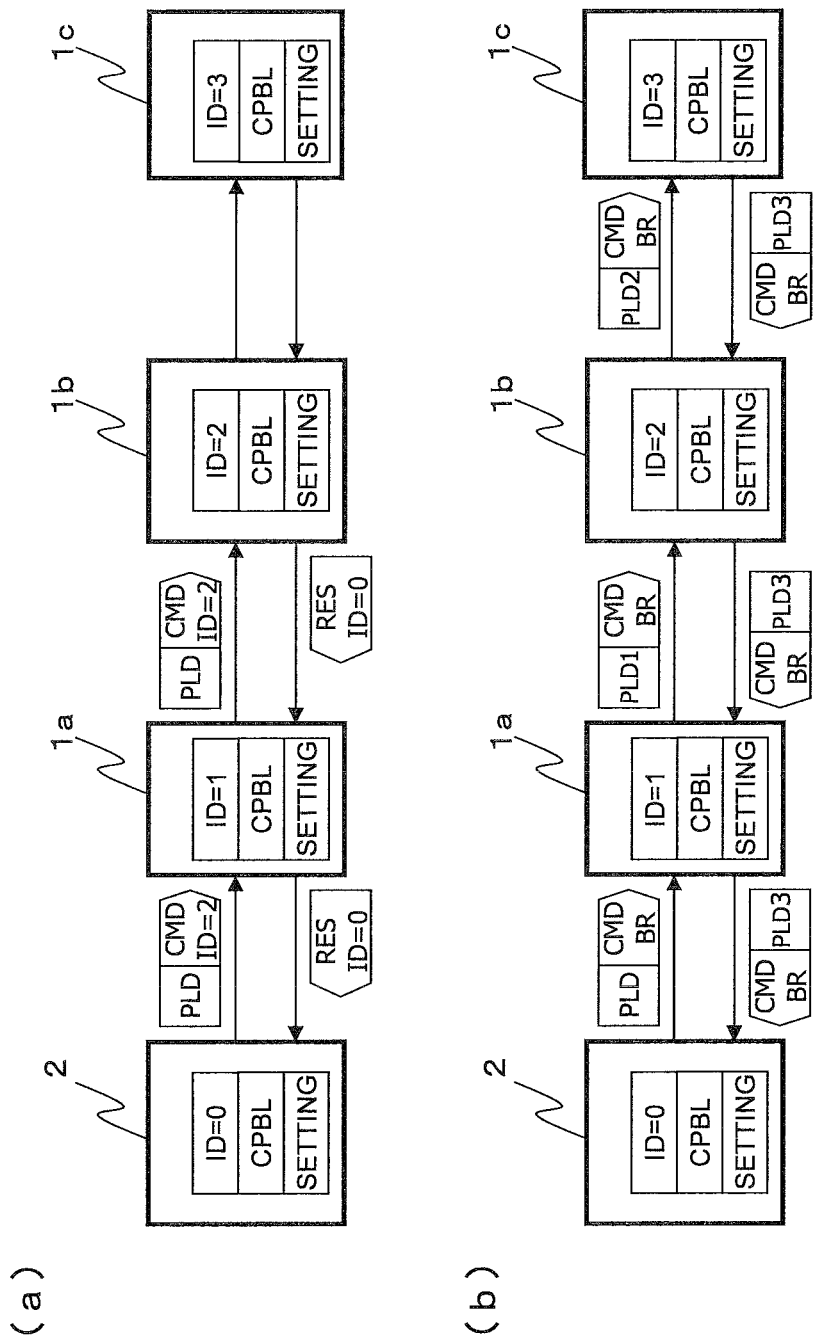
FIG. 6 is a diagram describing a command/response transmission and reception process performed in a chain topology.
Figure 7:
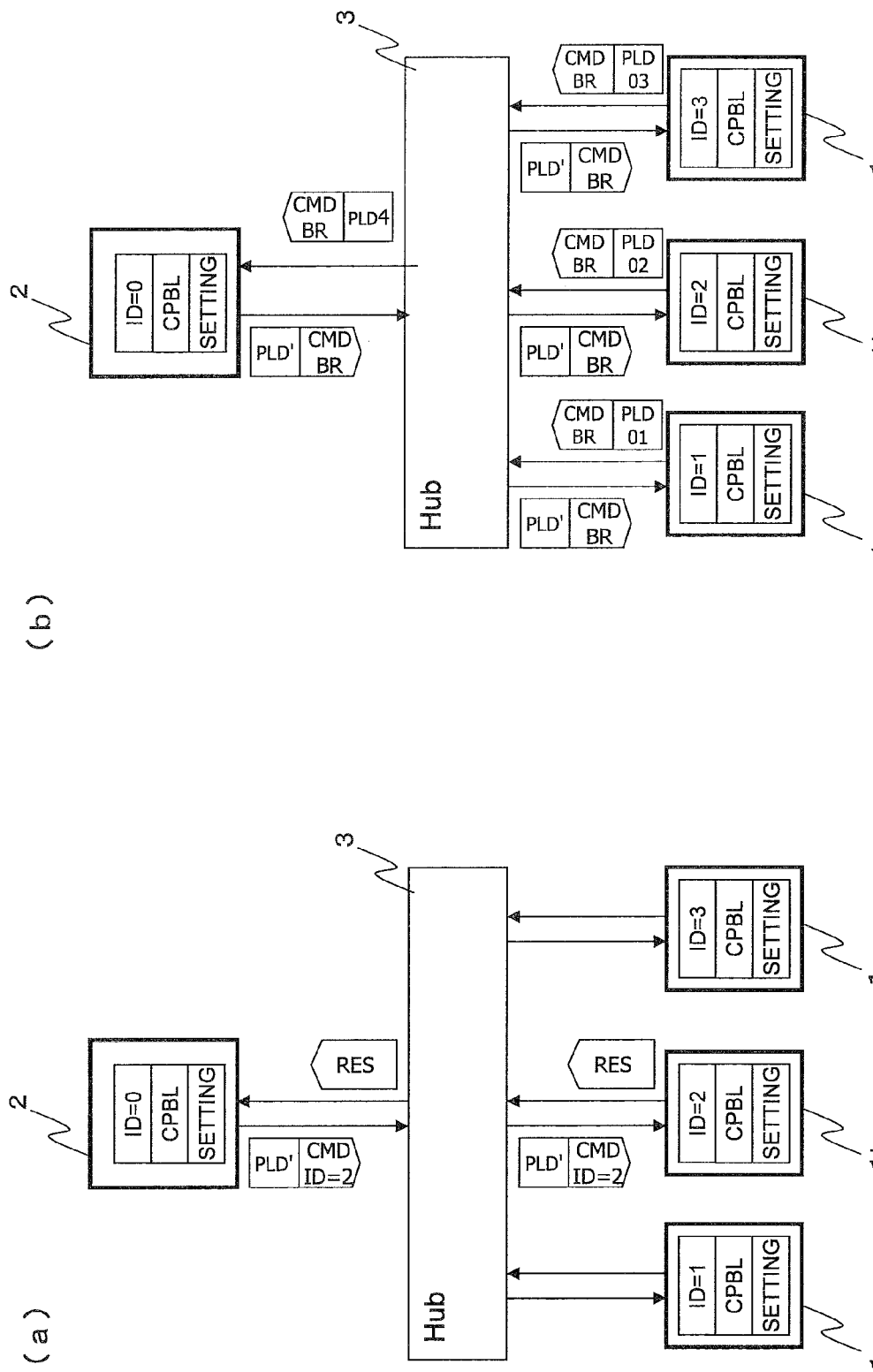
FIG. 7 is a diagram describing a command/response transmission and reception process performed in a hub topology.

FIGS. 5 to 7 are diagrams describing transmission and reception of a command and a response in the communication system 1000 of the present embodiment in which the master device 2 is connected to the plurality of slave devices 1a to 1c. FIGS. 5(a) and 5(b) show communication performed in a ring topology. FIGS. 6(a) and 6(b) show communication performed in a chain topology. FIGS. 7(a) and 7(b) show communication performed in a hub topology. In FIGS. 5 to 7, the ID of the master device 2 is set as ID=0, the ID of the slave device 1a is set as ID=1, the ID of the slave device 1b is set as ID=2, and the ID of the slave device 1c is set as ID=3.

1.2.3 Ring Topology

FIG. 5 is a diagram describing transmission and reception of a command and a response in the communication system 1000 of the present embodiment having a ring topology in which the master device 2 and the slave devices 1a to 1c are connected in a ring.

FIG. 5(a) shows communication performed when the master device 2 transmits a device-specific command to the slave device 1b. In FIG. 5(a), the master device 2 generates a command intended for the slave device 1b with ID=2. The slave device 1a receives the command, and detects that the ID included in the command differs from the ID of the slave device 1a. In this case, the slave device 1a transmits the command to the slave device 1b without changing the command. The slave device 1b receives the command transmitted from the slave device 1a, and detects that the ID included in the command is the same as the ID of the slave device 1b. In this case, the slave device 1b transmits a response RES in accordance with the received command. The ID of the master device 2, or ID=0, is set in the response RES. The slave device 1c receives the response RES transmitted from the slave device 1b, and detects that the ID included in the response RES differs from the ID of the slave device 1c. In this case, the slave device 1c transmits the response RES without changing the response. The master device 2 receives the response RES transmitted from the slave device 1c. The master device 2 then detects that the ID set in the received response RES is ID=0, and determines that the device-specific command has been received by the slave device 1b.

FIG. 5(b) shows communication performed when the master device 2 transmits a broadcast command to the slave devices 1a to 1c.

In FIG. 5(b), the master device 2 generates a broadcast command CMD BR. The slave device 1a receives the command, and detects that the received command is a broadcast command, and transmits the same command to the slave device 1b. The slave device 1a may perform processing based on the received command as well as the payload added to the command (PLD in FIG. 5 indicates a payload. The same applies to other figures), and may add the processing result to the command as a payload Payload1 and transmit a command to which Payload1 has been added. Alternatively, the slave device 1a may output the received payload without changing (may transmit the command to which the received payload has been added without changing the command).

In the same manner, the slave devices 1b and 1c thereafter output the received command together with the payload. In FIG. 5, the payload added to the command transmitted from the slave device 1b is referred to as Payload2, and the payload added to the command transmitted from the slave device 1c is referred to as Payload3. Payload 2 and Payload3 may be the same as the received payload. Alternatively, Payload2 and Payload3 may each indicate (or include) the processing result obtained through processing performed based on the received command as well as the payload added to the received command. When receiving the command CMD BR that the master device 2 has transmitted, the master device 2 determines that the broadcast command has been received by the slave devices 1a to 1c. When determining that a payload has been added to the received command, the master device 2 performs processing based on the payload data.

The payload data differs depending on each command. When, for example, the slave device 1b receives a broadcast command to which Payload1 (PLD1) has been added, Payload2 (PLD2) may store data resulting from an OR or an AND (a bitwise OR or a bitwise AND) of all or a part of the data stored in Payload1 (PLD1), which is a target for comparison, and the corresponding communication capability parameters CPBL, or may store data resulting from other processing. Alternatively, Payload2 (PLD2) may store a comparison result obtained by comparing values of all or a part of the data stored in Payload1 (PLD1), which is a target for comparison, and the corresponding communication capability parameters of the slave device 1b. The slave devices 1a and 1c perform the same processing as the slave device 1b.

1.2.4 Chain Topology

FIG. 6 is a diagram describing transmission and reception of a command and a response in the communication system 1000 of the present embodiment having a chain topology in which the master device 2 and the slave devices 1a to 1c are connected in a chain.

FIG. 6(a) shows communication performed when the master device 2 transmits a device-specific command to the slave device 1b. In FIG. 6(a), the master device 2 generates a command intended for the slave device 1b with ID=2. The slave device 1a receives the command from the master device 2, and detects that the ID included in the command differs from the ID of the slave device 1a. In this case, the slave device 1a transmits the command to the slave device 1b without changing the command. The slave device 1b receives the command transmitted from the slave device 1a, and detects that the ID included in the command is the same as the ID of the slave device 1b. The slave device 1b then transmits a response RES in accordance with the received command. The ID of the master device 2, or ID=0, is set in the response RES. The slave device 1b does not transmit the command to the slave device 1c.

The slave device 1a receives the response RES transmitted from the slave device 1b, and detects that the ID included in the response RES differs from the ID of the slave device 1a, and transmits the response RES to the master device 2 without changing the response. The master device 2 receives the response RES transmitted from the slave device 1a (the response RES in which ID=0), and determines that the device-specific command has been received by the slave device 1b.

FIG. 6(b) shows communication performed when the master device 2 transmits a broadcast command to the slave devices 1a to 1c.

In FIG. 6(b), the master device 2 generates a broadcast command CMD BR. The slave device 1a receives the command, and detects that the received command is a broadcast command, and transmits the same command as the received command (broadcast command) to the slave device 1b. The slave device 1a may perform processing based on the received command as well as the payload added to the command, and may add the processing result to the command as a payload Payload1 and transmit a command to which Payload1 has been added. Alternatively, the slave device 1a may output (transmit) the broadcast command to which the received payload has been added without changed.

In the same manner, the slave devices 1b and 1c output the received command (broadcast command) together with the payload. In FIG. 6, the payload added to the command transmitted from the slave device 1b is referred to as Payload2, and the payload added to the command transmitted from the slave device 1c is referred to as Payload3. Payload2 and Payload3 may be the same as the received payload. Alternatively, Payload2 and Payload3 may each indicate (or include) the processing result obtained through processing performed based on the received command as well as the payload added to the received command.

The payload data differs depending on each command. When, for example, the slave device 1b receives a broadcast command to which Payload1 (PLD1) has been added, Payload2 may store data resulting from an OR or an AND (a bitwise OR or a bitwise AND) of all or a part of the data stored in Payload1 (PLD1), which is a target for comparison, and the corresponding communication capability parameters CPBL of the slave device 1b, or may store data resulting from other processing. Alternatively, Payload2 (PLD2) may store a comparison result obtained by comparing values of all or a part of the data stored in Payload1 (PLD1), which is a target for comparison, and the corresponding communication capability parameters of the slave device 1b. The slave devices 1a and 1c may also perform the same processing as the slave device 1b.

The slave device 1b receives the command from the slave device 1c, and transmits the received command to the slave device 1a without changing the command. In the same manner, the slave device 1a transmits the received command to the master device 2 without changing the command. When receiving the command CMD BR that the master device 2 has transmitted, the master device 2 determines that the broadcast command has been received by the slave devices 1a to 1c. When determining that a payload has been added to the received command, the master device 2 performs processing based on the payload data.

1.2.5 Hub Topology

FIG. 7 is a diagram describing transmission and reception of a command and a response in the communication system 1000 of the present embodiment having a hub topology in which the master device 2 and the slave devices 1a to 1c are connected using a hub.

FIG. 7(a) shows communication performed when the master device 2 transmits a device-specific command to the slave device 1b. In FIG. 7(a), the master device 2 transmits a command to the slave device 1b with ID=2. A hub 3 detects that ID=2, and transmits the command to the slave device 1b. The slave device 1b detects that the ID included in the received command is the same as the ID of the slave device 1b, and transmits a response RES in accordance with the received command. The ID of the master device 2, or ID=0, is set in the response RES. The hub 3 receives the response RES transmitted from the slave device 1b, and then transmits the response RES to the master device 2 without changing the response. The master device 2 receives the response RES, and determines that the device-specific command has been received by the slave device 1b.

FIG. 7(b) shows communication performed when the master device 2 transmits a broadcast command to the slave devices 1a to 1c.

In FIG. 7(b), the master device 2 generates a broadcast command CMD BR. The hub 3 detects that the command is a broadcast command, and transmits the same command to the slave devices 1a to 1c without changing the command. The slave devices 1a to 1c detect that the received command is a broadcast command, and transmits the same command as the received command. The slave devices 1a to 1c perform processing based on the received command as well as the payload added to the command. Each of the slave devices 1a to 1c may add the processing result to the command as a payload Payload01, a payload Payload02, or a payload Payload03, and transmit a command to which Payload01, Payload02, or Payload03 has been added. Alternatively, the slave devices 1a to 1c may output (transmit) the received payload without changing.

The hub 3 (1) receives the command and the data stored in Payload01 transmitted by the slave device 1a, (2) the command and the data stored in Payload02 transmitted by the slave device 1b, and (3) the command and the data stored in Payload03 transmitted by the slave device 1c. The hub 3 then processes the commands and the data received from the slave devices 1a to 1c, and transmits the processing result to the master device 2 as a payload Payload4. The data stored in Payload4 differs depending on each command. For example, Payload4 may store data stored in a payload selected from Payload01, Payload02, and Payload03, or may store data resulting from an OR or an AND (a bitwise OR or a bitwise AND) of all or a part of the data stored in Payload01, Payload02, and Payload03, or may store data resulting from other processing. Alternatively, Payload4 may store a comparison result obtained by comparing values of all or a part of the data stored in Payload01, Payload02, and Payload03.

When receiving the command CMD BR that the master device 2 has transmitted, the master device 2 determines that the broadcast command that the master device 2 has transmitted has been received by the slave devices 1a to 1c. When determining that a payload has been added to the received command, the master device 2 performs processing based on the payload data.

As described above, the slave devices 1a to 1c perform the processing described below both when (A) the communication system 1000 has a point-to-point topology in which the master device 2 is connected to the single slave device and when (B) the communication system 1000 has a point-to-multipoint topology in which the master device 2 is connected to the plurality of slave devices.

(1) The slave device(s) detects whether the received command is a device-specific command or a broadcast command.

(2) For a device-specific command, the slave device returns a response when the ID included in the received command is the same as the ID of the device, and transmits the received command without changing the command when the ID included in the command differs from the ID of the device.

(3) For a broadcast command, the slave device performs processing required by the received command, and transmits the same command to which the processing result has been added as a new payload (a command (a broadcast command) causing the same processing as the received command).

For a device-specific command, the master device 2 determines that the destination slave device has received the transmitted device-specific command when receiving a response to the device-specific command. For a broadcast command, the master device 2 determines that all the slave devices (all the slave devices connected in a manner communicable with the master device 2) have received the transmitted command when receiving the same command as the transmitted command.

In the communication system 1000, the master device 2 and the slave device 1 or the slave devices 1a to 1c communicate with each other using a command and a response in the manners described above.

1.3 First Configuration Process

A first configuration process performed between the master device and the slave device(s) in the communication system 1000 of the present embodiment will now be described with reference to the drawings.

1.3.1 Structure of Parameter Display Unit and Parameter Setting Unit

FIG. 8 shows the communication capability parameters CPBL stored in the parameter display unit 211M included in the master device 2 or each of the slave devices 1 and 1a to 1c in the communication system 1000 and the communication setting parameters SETTING stored in the parameter setting unit 212M included in the master device 2 or each slave device.

The communication capability parameters CPBL include parameters indicating the functions and performance supported by the master device or the slave devices as well as the processing time required by the master device or the slave devices.

The communication setting parameters SETTING are parameters actually used in communication performed between the master device and the slave devices. The communication setting parameters SETTING include the same parameters as all or some of the communication capability parameters CPBL.

In FIG. 8, the set parameters include the interface performance, the data block length, the block number of transfer unit, the transition time to the power-saving mode, the recovery time from the power-saving mode, the number of the synchronizing symbols, and the block interval. These set parameters are used as the communication capability parameters CPBL. The above set parameters can also be used as the communication setting parameters SETTING (the communication setting parameters SETTING may include the above set parameters).

The parameters (the set parameters) should not be limited to the above parameters. Other parameters may also be added as necessary, or unnecessary parameters may be eliminated from the above set parameters. Further, a single register may store a plurality of parameters. Different registers may be used to store parameters depending on the details of each parameter (whether each parameter is associated with the physical layer or the link layer). A different register may be used to store (or set) each parameter.

In FIG. 8, the interface performance parameter indicates the transfer performance of the interface. This parameter may be set using, for example, a specific numerical value, such as 100 MB/s or 1 Gbps, or may be set using a value indicating a mode, a level, or a generation.

The data block length parameter indicates the size of a data block used to transmit or receive data or a maximum value of the block length supported by the system (a maximum block size). This parameter may be set using a specific numerical value (the number of bytes), such as 512 bytes or 1 Kbyte.

The transfer unit block number parameter indicates the number of blocks by which data is to be transferred by burst transfer during data transmission or reception. This parameter may be set using a specific numerical value (the number of blocks), such as four blocks or 16 blocks. The transfer unit block number may be set using a fixed value (meaning that the number of transfer blocks is only limited to this value), or only a maximum value may be set for the transfer unit block number.

The power-saving mode shift time parameter indicates the time required by the master device or the slave device during operation to shift from the operating status to the power-saving mode. The power-saving mode recovery time parameter indicates the time required by the master device or the slave device to recover from the power-saving mode to the operating status. The parameters may be set using an absolute time such as 100 ms, or the number of clock cycles such as 1000 cycles. The parameters may also be set using the number of symbols transmitted and received when the shift or the recovery is performed, such as 100 symbols. The power-saving mode shift time parameter and the power-saving mode recovery time parameter are mere examples, and the power-saving mode shift time parameter and/or the power-saving mode recovery time parameter may not be set.

The synchronous symbol number parameter indicates the number of symbols required by the master device and/or the slave device to synchronize the phase of clocks and data. This parameter may be set using a value indicating the number of symbols, such as 32 symbols or 64 symbols (this value is only required to indicate the number of symbols, and may not be directly the number of symbols).

The block interval parameter indicates a minimum interval between data blocks to be transferred. This parameter may be set using an absolute time such as 10 nanoseconds, or the clock cycle number such as 10 cycles. The parameter may also be set using a value indicating the number of symbols, such as 20 symbols, when predetermined symbols are transmitted between data blocks (this value is only required to indicate the number of symbols, and may not be directly the number of symbols).

The master device 2 obtains the communication capability parameters CPBL of the slave device 1 or the slave devices 1a to 1c in the configuration process (described below), and compares the obtained communication capability parameters CPBL of the slave device(s) and the communication capability parameters CPBL of the master device, and determines the parameters so as to be satisfied by both the master device and the slave device(s) (determines the values of the parameters satisfied by both the master device and the slave device(s)). The master device 2 then sets the determined parameters as the communication setting parameters SETTING to be used by the parameter setting unit 212M included in the slave device(s). For example, the communication setting parameters SETTING may be set in the manner described below.

(1) Setting the Interface Performance Parameter

A value indicating the lower interface performance between the values stored in the parameter display unit 211A and the parameter display unit 111S of the master device and the slave device is set as the interface performance parameter included in the communication setting parameters SETTING. When, for example, the parameter value of the master device is 1 Gbps and the parameter value of the slave device is 500 Mbps, the interface performance parameter included in the communication setting parameters SETTING is set at 500 Mbps in the communication system 1000. In this case, the master device and the slave device communicate with each other at 500 Mbps or lower.

(2) Setting the Data Block Length

A value indicating the smaller block length between the values stored in the master device and the slave device as the communication capability parameters CPBL is set as the data block length parameter included in the communication setting parameters SETTING. When, for example, the parameter value of the master device is 512 bytes and the parameter value of the slave device is 512 bytes or 1 Kbyte, the data block length parameter included in the communication setting parameters SETTING is set at 512 bytes in the communication system 1000. In this case, the master device and the slave device communicate with each other at a block length of 512 bytes or less. In the communication system 1000, when the data block length is to be set using a maximum block length and the parameter value of the master device is 512 bytes (512 bytes at maximum) and the parameter value of the slave device is 1 Kbyte (1 Kbyte at maximum), the data block length parameter of the communication setting parameters SETTING is set at 512 bytes (512 bytes at maximum). In this case, the master device and the slave device communicate with each other at a block length of 512 bytes or less.

(3) Setting the Power-Saving Mode Shift Time and the Power-Saving Mode Recovery Time A value indicating the longer time between the values stored in the master device and the slave device as the communication capability parameters CPBL is set as the power-saving mode shift time parameter or the power-saving mode recovery time included in the communication setting parameters SETTING. When, for example, the parameter value of the power-saving mode shift time (power-saving mode recovery time) of the master device is 100 ms and the same parameter value of the slave device is 150 ms, the power-saving mode shift time (power-saving mode recovery time) parameter included in the communication setting parameters SETTING is set at 150 ms in the communication system 1000. In this case, the master device and the slave device communicate with each other with a power-saving mode shift time or a power-saving mode recovery time of 150 ms or more.

(4) Setting the Synchronous Symbol Number

A value indicating the larger number of synchronous symbols between the values stored in the parameter display unit 211M of the master device and the parameter display unit 211S of the slave device as the communication capability parameters CPBL is set as the synchronous symbol number included in the communication setting parameters SETTING. The synchronous symbol number is the number of symbols that can be recognized as synchronous triggers by a data reception terminal.

(5) Setting the Block Interval

A value indicating the larger interval between the values stored in the parameter display units 211M and 111S of the master device and the slave device is set as the block interval parameter included in the communication setting parameters SETTING. The block interval indicates the interval between data packets, and is expressed using, for example, the number of idle symbols.

(6) Setting the Transfer Unit Block Number

A value indicating the smaller transfer unit block number between the values stored in the parameter display units 211M and 111S of the master device and the slave device is set as the transfer unit block number parameter included in the communication setting parameters SETTING. The transfer unit block number indicates the number of blocks transferred per flow control unit.

The above parameter settings are mere examples, and the present invention should not be limited to these examples.

As described above, the parameter values satisfied by both the master device and the slave device are set as the communication setting parameters SETTING in the communication system 1000, although the comparison (between values or lengths for example) differs depending on each parameter. More specifically, the communication setting parameters SETTING are set using values considering one of the master device and the slave device with the lower performance or using values smaller than such values considering one of the master device and the slave device with the lower performance.

The "parameter comparison" hereafter refers to the above process of comparing two parameters and selecting a parameter value considering the lower performance or selecting a value smaller than the parameter value considering the lower performance.

The master device 2 may set, for some or all of the communication setting parameters SETTING, parameters satisfied by the slave devices 1 and 1a to 1c as the communication setting parameters SETTING of the master device 2 to be used by the parameter setting unit 112S, and may set parameters satisfied by the master device 2 as the communication setting parameters SETTING of the slave devices 1 and 1a to 1c to be used by the parameter setting units 112S of the slave devices 1a to 1c. This setting also enables both the master device 2 and the slave devices 1 and 1a to 1c to communicate with each other using the parameters that are satisfied by their communication destination devices.

1.3.2 Configuration Process for Point-to-Point Topology

Figure 9:
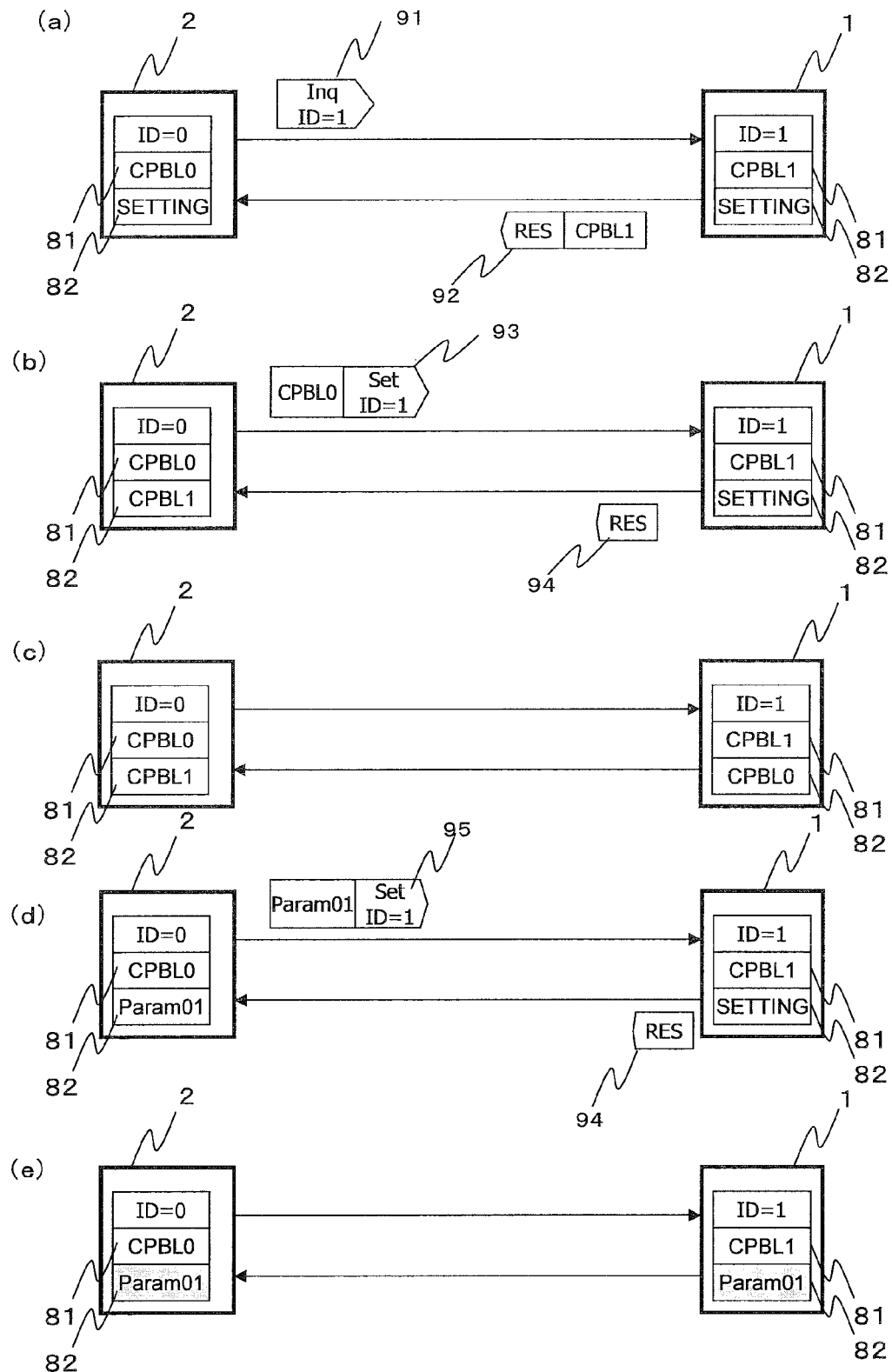
FIG. 9 is a diagram describing a configuration process performed in a point-to-point topology.

FIG. 9 is a diagram describing a configuration process performed in a point-to-point topology in which the master device 2 and the single slave device 1 are connected to each other.

In FIG. 9(*a*), the master device 2 generates a parameter obtaining command 91 (Inq) for reading the communication capability parameters CPBL1 stored in the parameter display unit of the slave device 1 and transmits, to the slave device 1, the parameter obtaining command in which the ID of the slave device 1 is set.

The slave device 1 receives the command 91 transmitted from the master device 2, and transmits a response 92 including the parameters CPBL1 stored in its parameter display unit to the master device 2.

In FIG. 9(*b*), the master device 2 sets the parameters CPBL1 included in the response 92 as parameters to be used by the parameter setting unit of the master device 2, and transmits a parameter setting command 93 (Set) to the slave device 1 to set the parameters CPBL0 stored in the parameter display unit of the master device 2 as parameters to be used by the slave device 1.

The slave device 1 sets the parameters CPBL0 included in the command 93 as the parameters to be used by the parameter setting unit of the slave device 1, and transmits a response 94 to the master device 2.

After the above processing, the communication system 1000 having a point-to-point topology enters the state shown in FIG. 9(c). More specifically, the master device 2 sets the parameters stored in the parameter display unit of its communication destination device, or the slave device 1, as parameters to be used by the parameter setting unit of the master device 2, and the slave device 1 sets the parameters stored in the parameter display unit of its communication destination device, or the master device 2, as parameters to be used by the parameter setting unit of the slave device 1. The master device 2 and the slave device 1 thereafter communicate with each other using the set parameters. This setting enables each of the master device 2 and the slave device 1 to determine the communication capabilities of its communication destination device, and enables efficient communication to be performed in the communication system 1000 having a point-to-point topology.

A configuration process described below may be performed in the communication system 1000 having a point-to-point topology. As shown in FIG. 9(d), the master device 2 may compare the communication capability parameters CPBL1 of the slave device 1 obtained in FIG. 9(d) with the communication capability parameters CPBL0 of the master device 2, and may set common parameters Param01, which are parameters satisfied by both the master device 2 and the slave device 1, as parameters to be used by the parameter setting unit of the master device 2. The master device 2 may then transmit a parameter setting command 95 to the slave device 1 to set the common parameters Param01 as parameters to be used by the parameter setting unit of the slave device 1. In this case, the master device 2 and the slave device 1 set the common parameters Param01 as their communication setting parameters SETTING as shown in FIG. 9(e). The master device 2 and the slave device 1 thereafter communicate with each other using the set parameters Param01.

1.3.3 First Configuration Process for Ring Topology

FIG. 10 is a diagram describing a first configuration process performed in the communication system 1000 having a ring topology in which the master device 2 and the slave devices 1a to 1c are connected in a ring.

Figure 10A:
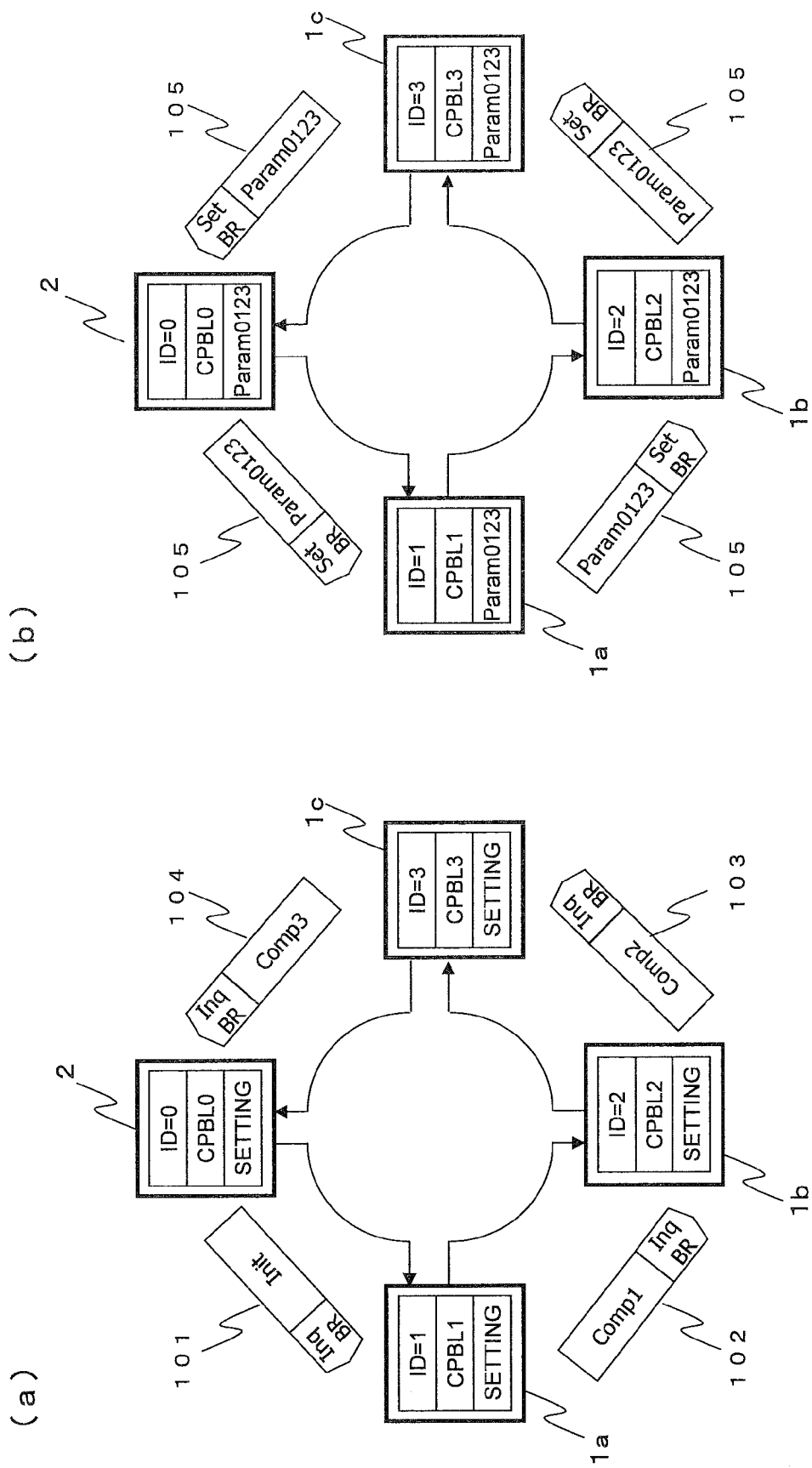
FIG. 10A(a) is a diagram describing broadcast transmission of initial values by a master device in a ring topology, and FIG. 10A(b) is a diagram describing broadcast transmission of parameter setting values by a master device in a ring topology.

As shown in FIGS. 10A(a) and 10A(b), the master device 2 transmits, as a broadcast command, a parameter obtaining command 101 to which initial values Init have been added as a payload. The initial values Init may be freely selected values, or may be the values of the communication capability parameters CPBL0 stored in the parameter display unit of the master device 2. Alternatively, these two different values may be used as initial values Init for different parameters (freely selected values to be set as initial values may be used for some parameters and the values of communication capability parameters CPBL0 stored in the parameter display unit of the master device 2 may be used for other parameters).

The slave device 1a receives the parameter obtaining command 101, and compares the initial values Init added to the command and the corresponding communication capability parameters CPBL stored in the parameter display unit of the slave device 1a (compares the initial values Init set for the different parameters and the corresponding communication capability parameters CPBL). The slave device 1a then transmits, to the subsequent slave device 1b, a parameter obtaining command 102 to which the comparison result Comp1 has been added as a new payload. The comparison result Comp1 is the result of comparison performed between the initial values Init and the corresponding communication capability parameters CPBL stored in the parameter display unit of the slave device 1a, and is specifically formed using parameter values set based on the result of comparison performed between the initial values Init set for the different parameters and the corresponding communication capability parameters CPBL.

As described above, the "comparison" refers to selecting a parameter value indicating the lower performance of two parameter values or selecting a value smaller than the parameter value indicating the lower performance.

When receiving the parameter obtaining command 102, the slave device 1b compares the comparison result Comp1 and the parameters CPBL2. The slave device 1b then transmits, to the subsequent slave device 1c, a parameter obtaining command 103 to which the comparison result Comp2 has been added as a new payload.

In the same manner, the slave device 1c compares the comparison result Comp2 and the parameters CPBL3, and transmits a parameter obtaining command 104 to which the comparison result Comp3 has been added as a new payload.

The master device 2 receives the parameter obtaining command 104. The parameter values stored in the payload Comp3 added to the parameter obtaining command 104 are values satisfied by all the slave devices 1a to 1c. More specifically, the parameter values stored in the payload Comp3 are set using the values indicating the lowest communication capability of the slave devices 1a to 1c. In other words, each parameter value stored in the payload Comp3 (Para_comp3 [i]) is set using the value indicating the lowest communication capability among the parameter values (Para_S1a [i], Para_S1b [i], and Para_S1c [i]) stored as the communication capability parameters CPBL of the slave devices 1a to 1c.

More specifically, when the value indicating the lowest communication capability is a minimum value, Para_comp3 [i]=Min (Para_S1a [i], Para_S1b [i], and Para_S1c [i])

(where i=1 to N, and N is the number of parameters).

When the value indicating the lowest communication capability is a maximum value, Para_comp3 [i]=Max (Para_S1a [i], Para_S1b [i], and Para_S1c [i])

(where i=1 to N, and N is the number of parameters).

Min ( ) is a function to obtain a minimum value of elements. Max ( ) is a function to obtain a maximum value of elements.

The value Para_S1a [i] (i=1 to N) is a parameter value stored as a communication capability parameter CPBL of the slave device 1a.

The value Para_S1b [i] (i=1 to N) is a parameter value stored as a communication capability parameter CPBL of the slave device 1b.

The value Para_S1c [i] (i=1 to N) is a parameter value stored as a communication capability parameter CPBL of the slave device 1c.

The master device 2 receives the parameter obtaining command 104. Based on the values set in the received command (values set in the payload Comp3), the master device 2 sets parameters Param0123 satisfied by the master device 2 and the slave devices 1a to 1c as parameters to be used by the parameter setting unit of the master device 2. More specifically, (1) When the communication capability parameters CPBL0 of the master device 2 are set as the initial values Init in the parameter obtaining command 101, the master device 2 determines that Param0123=Comp3, and sets the parameters Param0123 as parameters to be used by the parameter setting unit of the master device 2.

(2) When the communication capability parameters CPBL0 of the master device 2 are not set as the initial values Init in the parameter obtaining command 101, the master device 2 sets the values indicating the lower communication capability among the values Comp3 received by the master device 2 and the communication capability parameters CPBL0 of the master device 2 to obtain parameters Param0123, and sets the obtained parameters Param0123 as parameters to be used by the parameter setting unit of the master device 2.

As shown in FIG. 10A(b), the master device 2 then adds a payload storing the set values (Param0123) to a parameter setting command 105, and transmits the command as a broadcast command.

The slave devices 1a to 1c receive the parameter setting command 105 transmitted from the master device 2, and set the parameters Param0123 stored in the payload as parameters to be used by the parameter setting units of the slave devices, and then transmit the received command 105 without changing the command.

The master device 2 receives the command 105. This completes the configuration process performed in the communication system 1000 having a ring topology.

The setting of the block interval parameter shown in FIG. 8 in the communication system 1000 will now be described with reference to FIGS. 10B(c) and 10B(d).

Figure 10B:
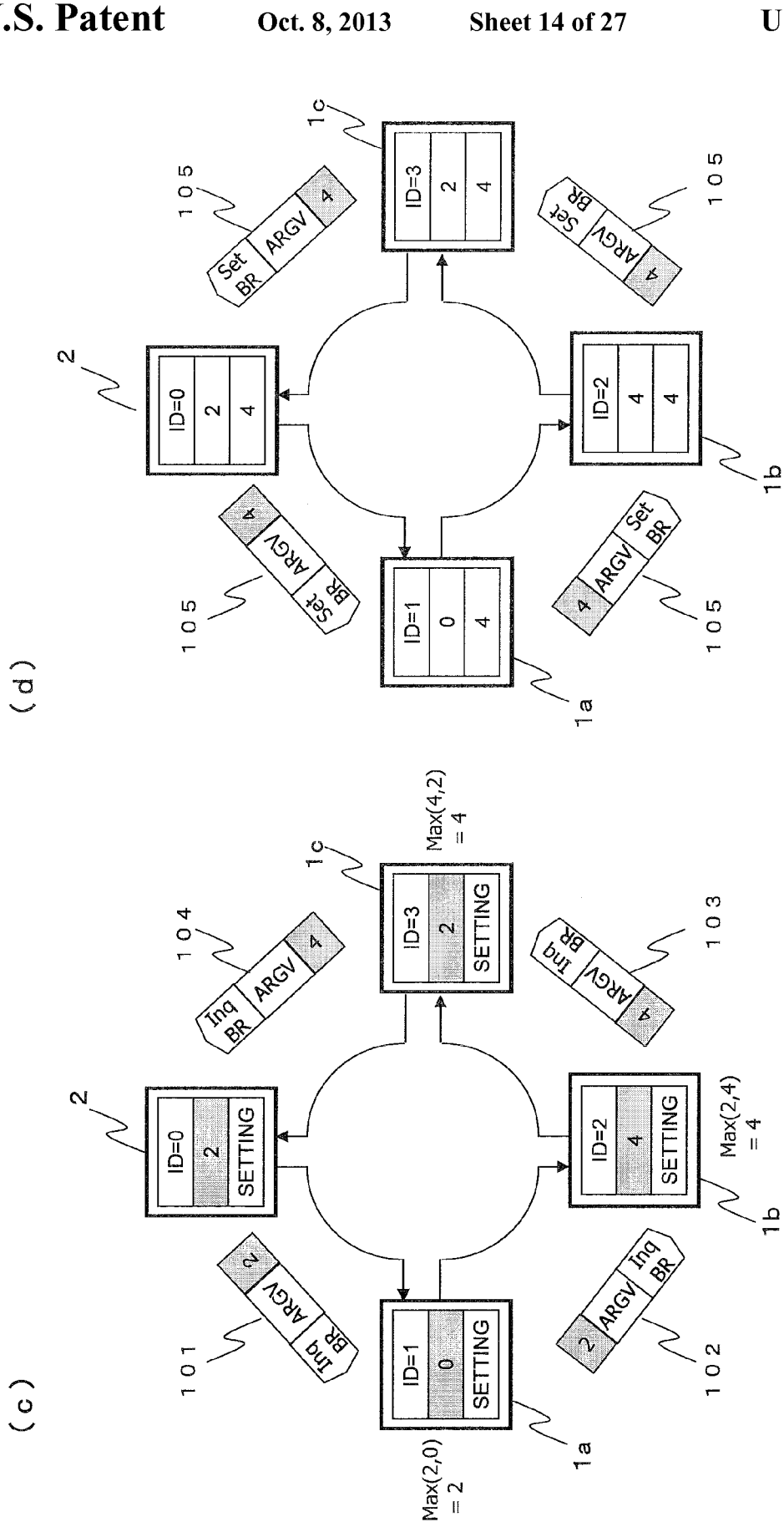
FIG. 10B(c) is a diagram describing broadcast transmission of initial values by a master device in a ring topology, and FIG. 10B(d) is a diagram describing broadcast transmission of parameter setting values by a master device in a ring topology.

As shown in FIG. 10B(c), the block interval parameter, which is one of the communication capability parameters, is 2 for the master device 2, it is 0 for the slave device 1a, it is 4 for the slave device 1b, and it is 2 for the slave device 1c.

As shown in FIG. 10B(c), the master device 2 generates a parameter obtaining command 101 to which an initial value of 2 for the block interval parameter is added as a payload, and transmits the generated parameter obtaining command 101 as a broadcast command.

The slave device 1a receives the parameter obtaining command 101, and compares the initial value of 2 added to the command with the block interval parameter value of 0 included in the communication capability parameters stored in the parameter display unit of the slave device 1a. For the block interval parameter, a larger value indicates a lower communication capability. Thus, the comparison uses the Max ( ) function. More specifically, the slave device 1a obtains 2 as the comparison result written as Max (2, 0)=2.

The slave device 1a generates a parameter obtaining command 102 to which the comparison result of 2 has been added as a new payload, and transmits the generated parameter obtaining command 102 to the subsequent slave device 1b.

The slave device 1b receives the parameter obtaining command 102, and compares the block interval parameter value of 2 stored in the payload of the received command with the block interval parameter value of 4 included in the communication capability parameters CPBL of the parameter display unit of the slave device 1b in the same manner. More specifically, the slave device 1b obtains 4 as the comparison result written as Max (2, 4)=4.

The slave device 1b generates a parameter obtaining command 103 to which the obtained value of 4 has been added as a new payload, and transmits the parameter obtaining command 103 to the subsequent slave device 1c.

The slave device 1c receives the parameter obtaining command 103, and compares the block interval parameter value of 4 stored in the payload of the received command with the block interval parameter value of 2 included in the communication capability parameters CPBL of the parameter display unit of the slave device 1c in the same manner. More specifically, the slave device 1c obtains 4 as the comparison result written as Max (4, 2)=4.

The slave device 1c generates a parameter obtaining command 104 to which the comparison result of 4 has been added as a new payload, and transmits the parameter obtaining command 104 to the master device 2.

The master device 2 receives the parameter obtaining command 104. The block interval parameter value of 4 stored in the payload added to the parameter obtaining command 104 is a parameter value satisfied by all the slave devices 1a to 1c. More specifically, each parameter value stored in the payload Comp3 is set using a lower limit value of 4 (a maximum value of 4 in this case) of the communication capability (the communication capability for the block interval) of each of the master device 2 and the slave devices 1a to 1c.

The master device 2 receives the parameter obtaining command 104. Based on the value set in the received command (the value set in the payload of the command), the master device 2 sets the block interval parameter value of 4 satisfied by the master device 2 and the slave devices 1a to 1c as a parameter to be used by the parameter setting unit of the master device 2. As shown in FIG. 10B(d), the master device 2 then generates a parameter setting command 105 to which the block interval parameter value of 4 is added as a payload, and transmits the parameter setting command 105 as a broadcast command.

The slave devices 1a to 1c receive the parameter setting command 105 transmitted from the master device 2, and sets the block interval parameter value of 4 stored in the payload as a parameter to be used by the parameter setting units of the slave devices, and transmits the received command 105 without changing the command.

As a result, the master device 2 receives the command 105. This completes the configuration process performed in the communication system 1000 having a ring topology. In this case, the block interval parameter value included in the communication setting parameters of the master device and the slave devices 1a to 1c is set at 4. This completes the configuration process.

Figure 10C:
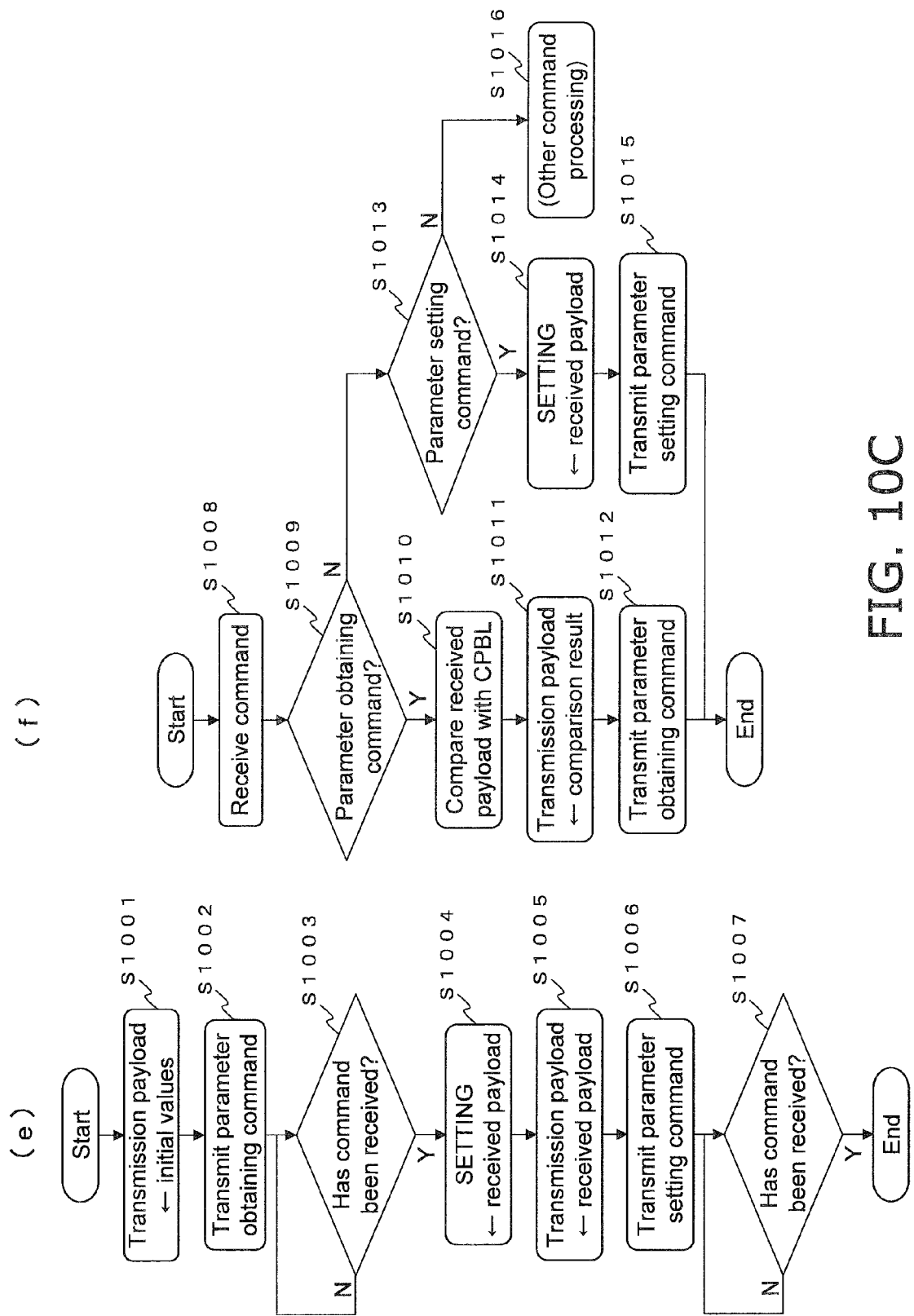
FIG. 10C(e) is a flowchart showing a configuration process of a master device, and FIG. 10C(f) is a flowchart showing a configuration process of a slave device.

FIGS. 10C(e) and 10C(f) are flowcharts showing the first configuration process performed by the master device 2 and by the slave devices 1a to 1c in the communication system 1000.

Processing Performed by Master Device
S1001:
As shown in FIG. 10C(e), the master device 2 sets initial values in a payload of a parameter obtaining command (S1001).
S1002:
The master device 2 transmits, as a broadcast command, the parameter obtaining command in which the initial values have been set in the payload (S1002).
S1003:
The master device 2 waits until receiving the command that the master device 2 has transmitted (waits until the command is returned) (S1003). Although the initial values include the parameters satisfied by the master device 2 in this example, the initial values may be other values as described above.

S1004:

The master device 2 receives the command, and sets values stored in the payload as the parameters SETTING to be used by the parameter setting unit of the master device 2 (S1004).

S1005:

The master device 2 then generates a parameter setting command in which the payload of the received command has been set as a payload to be transmitted (transmission payload) (S1005).

S1006:

The master device 2 transmits, as a broadcast command, the parameter setting command to which the received payload has been added as a new transmitted payload (S1006).

S1007:

The master device 2 receives the command that the master device 2 has transmitted (S1007).

This completes the configuration process performed in the communication system 1000.

Processing Performed by Slave Device

S1008:

As shown in FIG. 10C(f), the slave devices 1a to 1c receive a command (S1008).

S1009:

The slave devices 1a to 1c determine whether the received command is a parameter obtaining command (S1009).

S1010:

When determining that the received command is a parameter obtaining command, the slave devices 1a to 1c compare the parameters stored in the payload added to the received command with the parameters stored in the parameter display units of the slave devices (S1010).

S1011:

The slave devices 1a to 1c set the comparison result as a new payload of the command (S1011).

S1012:

The slave devices 1a to 1c transmit the parameter obtaining command to which the new payload generated in step S1011 has been added (S1012).

S1013:

When determining that the received command is not a parameter obtaining command, the slave devices 1a to 1c further determine whether the received command is a parameter setting command (S1013).

S1014:

When determining that the received command is a parameter setting command, the slave devices 1a to 1c set the parameters stored in the payload added to the received command as parameters SETTING to be used by the parameter setting units of the slave devices 1a to 1c (S1014).

S1015:

The slave devices 1a to 1c transmit the received parameter setting command without changing the command (S1015).

S1016:

When determining that the received command is not a parameter obtaining command or a parameter setting command, the slave devices 1a to 1c perform processing required in accordance with the type of the received command (S1016).

In the communication system 1000, the master device 2 and the slave devices 1a to 1c perform the configuration process using the parameter obtaining command and the parameter setting command in the manner described above.

Figure 10D:
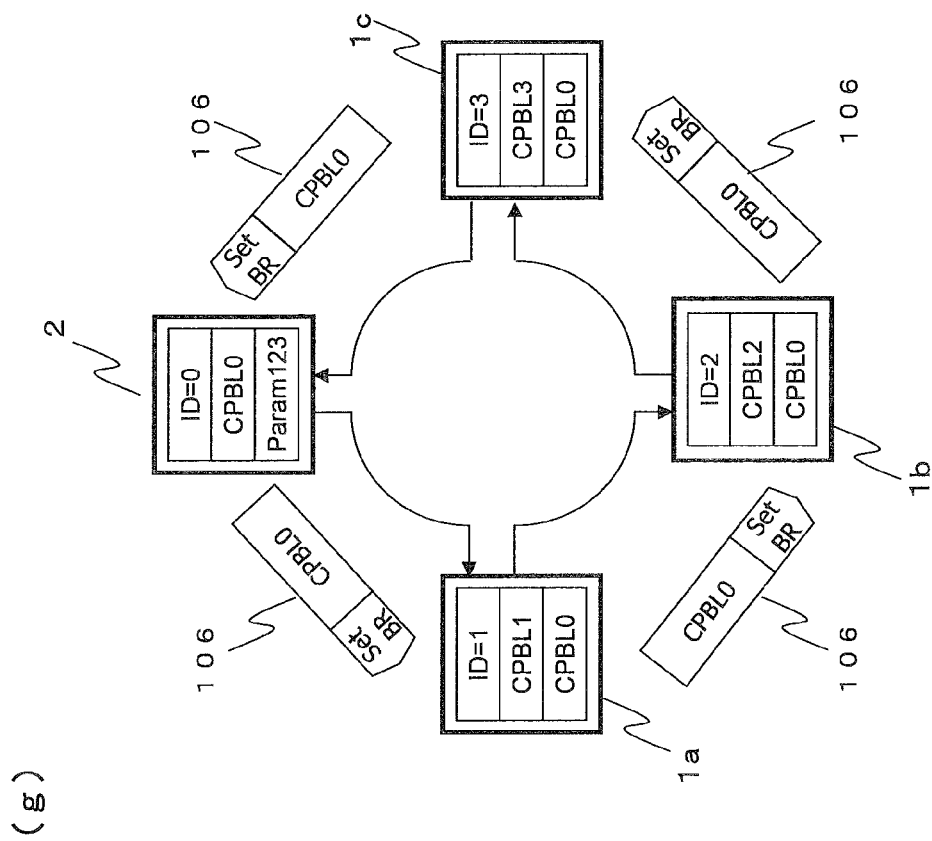
FIG. 10D(e) is a diagram describing broadcast transmission of a master device setting value by a master device in a ring topology.

The parameters may alternatively be set in the manner described below as shown in FIG. 10D(g). The master device 2 obtains the parameters using the parameter obtaining command, or specifically obtains the parameters Param123 commonly satisfied by the slave devices 1a to 1c, and sets the obtained parameters as parameters to be used by the parameter setting unit of the master device 2. The parameters CPBL0 stored in the parameter display unit of the master device 2 are set as parameters to be used by the slave devices 1a to 1c. Under these settings, the master device 2 stores the parameters commonly satisfied by the slave devices 1a to 1c as its parameters SETTING, whereas the slave devices 1a to 1c store the parameters CPBL0 satisfied by the master device 2 as their parameters SETTING. When communication always occurs only between the master device and the slave devices in the communication system 1000 and no communication occurs between the slave devices, the above parameter settings enable the communication system 1000 to perform such communication (between the master device and the slave devices).

In an embedded system in which the master device 2 and the slave devices 1a to 1c are mounted on the same substrate, parameters to be set may be prestored in, for example, a ROM or a nonvolatile memory such as a flash memory included in the master device, and the parameters stored in the ROM or the nonvolatile memory may be set using a parameter setting command when the system is initialized. In this case, the parameters of the slave devices 1a to 1c can be set using the prestored parameters. This structure eliminates the need for a parameter obtaining command, and shortens the initialization time required in the communication system 1000.

1.3.4 First Configuration Process for Chain Topology

Figure 12:
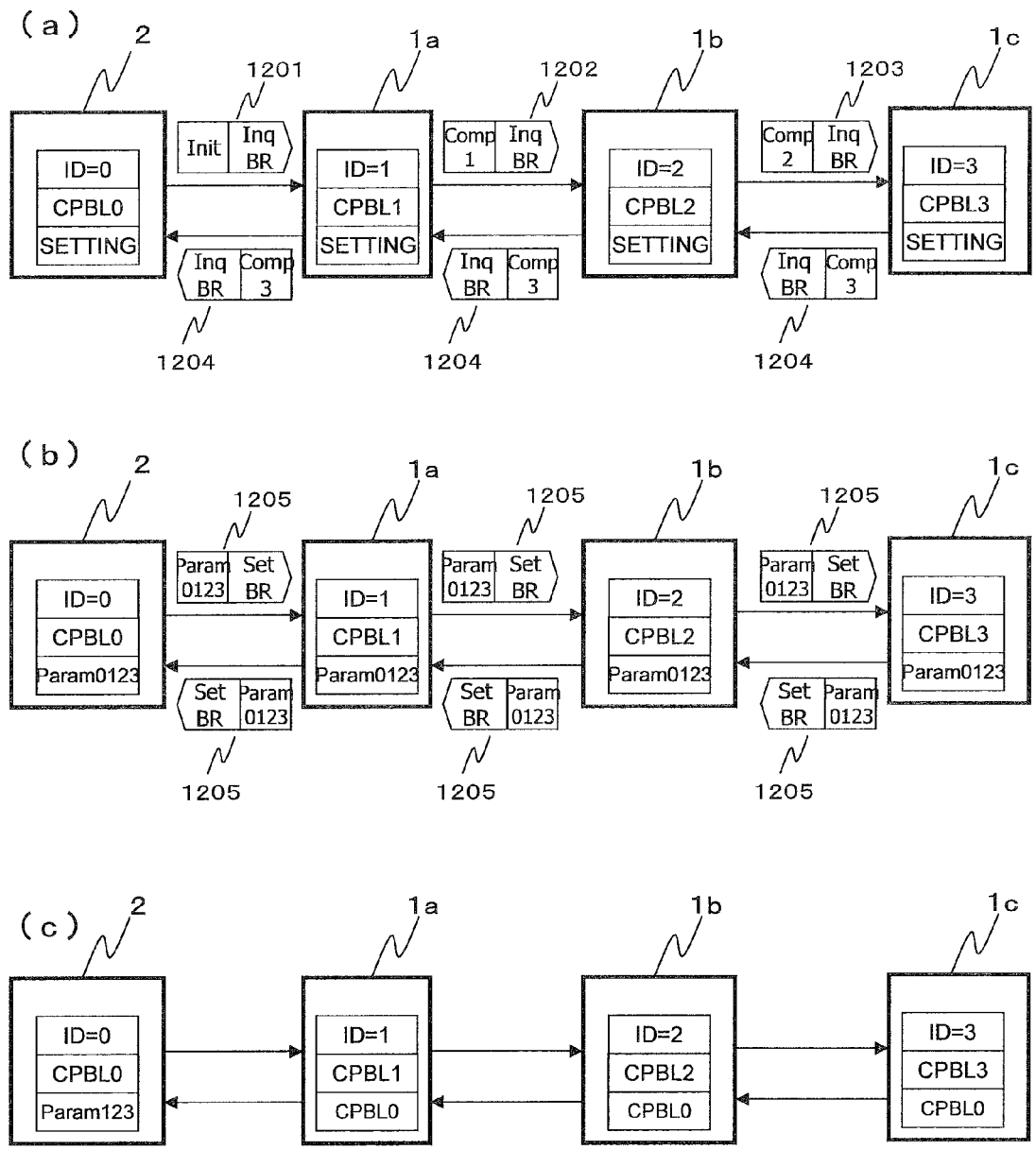
FIG. 12 is a diagram describing a first configuration process performed in a chain topology.

FIG. 12 is a diagram describing a first configuration process performed in the communication system 1000 having a chain topology in which the master device 2 and the slave devices 1a to 1c are connected in a chain.

As shown in FIG. 12(a), the master device 2 transmits, as a broadcast command, a parameter obtaining command 1201 to which the initial values Init have been added as a payload. The initial values Init may be freely selected values, or may be the values of the communication capability parameters CPBL0 stored in the parameter display unit of the master device 2. Alternatively, these two different values may be used as initial values Init for different parameters (freely selected values to be set as initial values may be used for some parameters and the values of communication capability parameters CPBL0 stored in the parameter display unit of the master device 2 may be used for other parameters).

The slave device 1a receives the parameter obtaining command 1201, and compares the initial values Init added to the command and the corresponding communication capability parameters CPBL stored in the parameter display unit of the slave device 1a (compares the initial values Init set for the different parameters with the corresponding communication capability parameters CPBL). The slave device 1a then transmits, to the subsequent slave device 1b, a parameter obtaining command 1202 to which the comparison result Comp1 has been added as a payload. The comparison result Comp1 is formed using parameter values set based on the result of comparison performed between the initial values Init set for the different parameters and the corresponding communication capability parameters CPBL stored in the parameter display unit of the slave device 1a.

In the same manner, the slave device 1b receives the parameter obtaining command 1202 and compares the comparison result Comp1 and the parameters CPBL2, and transmits, to the subsequent slave device 1c, a parameter obtaining command 1203 to which the comparison result Comp2 has been added as a payload.

In the same manner, the slave device 1c also compares the comparison result Comp2 and the parameters CPBL3, and transmits a parameter obtaining command 1204 to which the comparison result Comp3 has been added as a new payload.

As shown in FIG. 12(a), the slave devices 1b and 1a receive the parameter obtaining command 1204 transmitted from the slave device 1c, and transmit the received parameter obtaining command without changing the command.

As a result, the master device 2 receives the parameter obtaining command 1204 transmitted from the slave device 1a. The parameter values stored in the payload Comp3 added to the parameter obtaining command 1204 are communication parameters satisfied by all the slave devices 1a to 1c. More specifically, each parameter value stored in the payload (Para_comp3 [i]) is set using a lower limit value (value indicating the lowest communication capability) among the parameter values (Para_S1a [i], Para_S1b [i], and Para_S1c [i]) stored as the communication capability parameters CPBL of the slave devices 1a to 1c.

More specifically, when the lower limit value (value indicating the lowest communication capability) is a minimum value, Para_comp3 [i]=Min (Para_S1a [i], Para_S1b [i], and Para_S1c [i])

(where i=1 to N, and N is the number of parameters).

When the lower limit value (value indicating the lowest communication capability) is a maximum value, Para_comp3 [i]=Max (Para_S1a [i], Para_S1b [i], and Para_S1c [i])

(where i=1 to N, and N is the number of parameters).

Min ( ) is a function to obtain a minimum value of elements. Max ( ) is a function to obtain a maximum value of elements.

The value Para_S1a [i] (i=1 to N) is a parameter value stored as a communication capability parameter CPBL of the slave device 1a.

The value Para_S1b [i] (i=1 to N) is a parameter value stored as a communication capability parameter CPBL of the slave device 1b.

The value Para_S1c [i] (i=1 to N) is a parameter value stored as a communication capability parameter CPBL of the slave device 1c.

The master device 2 receives the parameter obtaining command 1204. Based on the values set in the received command (values set in the payload Comp3), the master device 2 sets parameters Param0123 satisfied by the master device 2 and the slave devices 1a to 1c as the parameters SETTING to be used by the parameter setting unit of the master device 2. As shown in FIG. 12(b), the master device 2 then adds a payload storing the set values to a parameter setting command 1205, and transmits the command as a broadcast command.

The slave devices 1a to 1c receive the parameter setting command 1205 transmitted from the master device 2, and set the parameters Param0123 stored in the payload as parameters to be used by the parameter setting units of the slave devices, and then transmit the received command 1205 without changing the command.

In this manner, the parameter setting command 1205 is transferred between the slave devices 1a to 1c. The master device 2 finally receives the parameter setting command 1205. This completes the configuration process performed in the communication system 1000 (FIG. 12(b)).

The parameters may alternatively be set in the manner described below as shown in FIG. 12(c). The master device 2 obtains the parameters using the parameter obtaining command, or specifically obtains the parameters Param123 commonly satisfied by the slave devices 1a to 1c, and sets the obtained parameters as parameters to be used by the parameter setting unit of the master device 2. The parameters CPBL0 stored in the parameter display unit of the master device 2 are set as parameters to be used by the slave devices 1a to 1c. Under these settings, the master device 2 stores the parameters commonly satisfied by the slave devices 1a to 1c as its parameters SETTING, whereas the slave devices 1a to 1c store the parameters CPBL0 satisfied by the master device 2 as their parameters SETTING. When communication always occurs only between the master device and the slave devices in the communication system 1000 and no communication occurs between the slave devices, the above parameter settings enable the communication system 1000 to perform such communication (between the master device and the slave devices).

1.3.5 First Configuration Process for Hub Topology

Figure 14A:
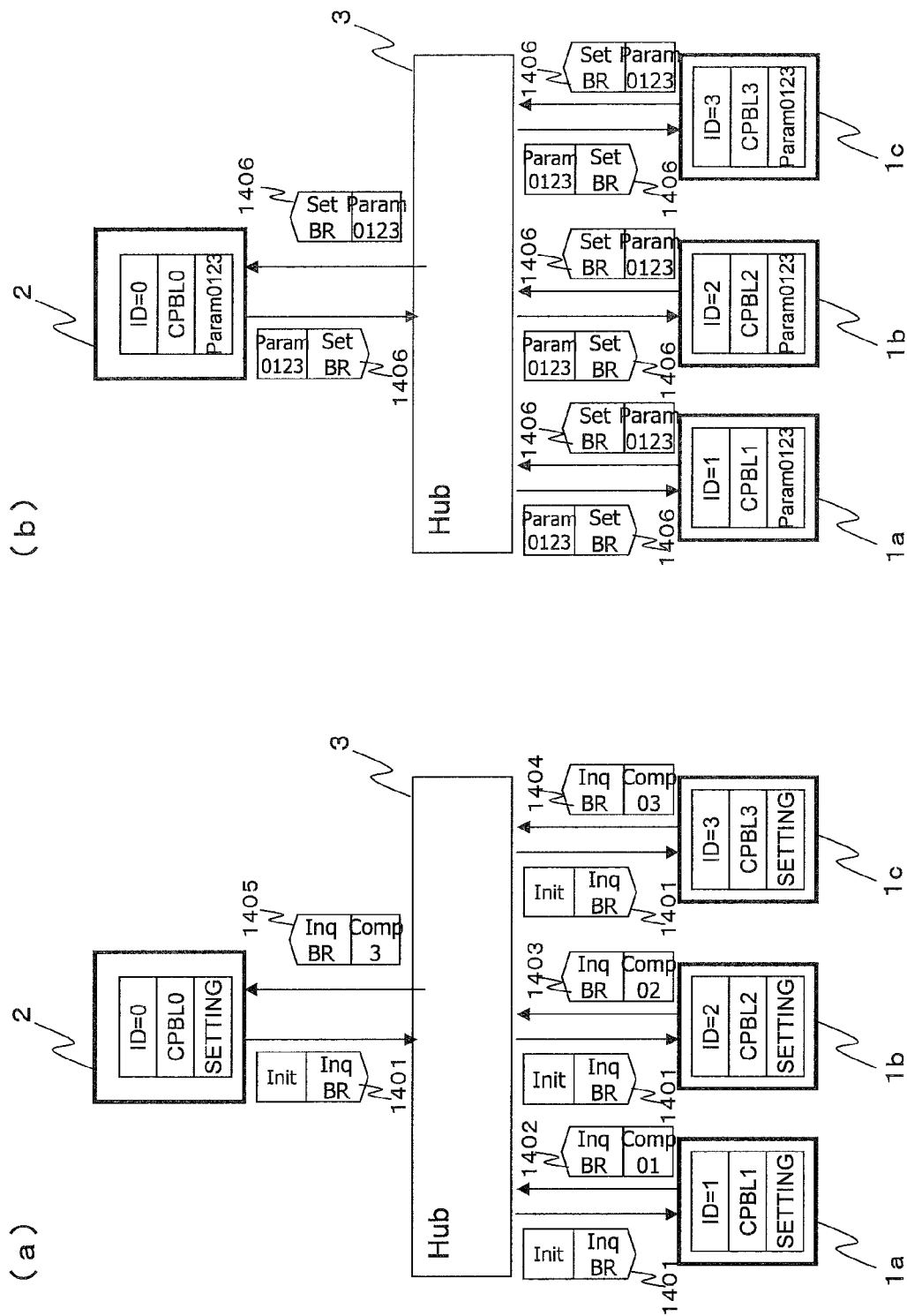
FIG. 14A(a) is a diagram describing transmission of initial values by a master device in a hub topology, and FIG. 14A(b) is a diagram describing transmission of parameter setting values by a master device in a hub topology.

FIG. 14(a) is a diagram describing a first configuration process performed in a hub topology in which the mater device 2 and the slave devices 1a to 1c are connected in a chain.

As shown in FIG. 14A(a), the master device 2 transmits, as a broadcast command, a parameter obtaining command 1401 to which the initial values Init have been added as a payload. The initial values Init may be freely selected values, or may be the values of the communication capability parameters CPBL0 stored in the parameter display unit of the master device 2. Alternatively, these two different values may be used as initial values Init for different parameters (freely selected values to be set as initial values may be used for some parameters and the values of communication capability parameters CPBL0 stored in the parameter display unit of the master device 2 may be used for other parameters).

In FIG. 14A(a), the hub 3 transmits the parameter obtaining command 1401 to the slave devices 1a to 1c.

The slave devices 1a to 1c receive the parameter obtaining command 1401 from the hub 3, and compare the initial values Init added to the command and the corresponding communication capability parameters CPBL stored in the parameter display units of the slave devices (compare the initial values Init set for the different parameters and the corresponding communication capability parameters CPBL). The slave devices 1a to 1c then transmit, to the hub, parameter obtaining commands 1402, 1403, and 1404 to which the comparison results Comp01, Comp02, and Comp03 have been added as payloads.

The hub 3 receives the commands 1402 to 1404 from the slave devices 1a to 1c, and then performs the processing (1) to (3) described below.

(1) The hub 3 obtains parameter values indicating the communication capability of the slave devices 1a to 1c from the payloads Comp01, Comp02, and Comp03 added to the commands 1402 to 1404 received from the slave devices 1a to 1c.

(2) The hub 3 detects the lower limit value (value indicting the lowest communication capability) for each parameter from the obtained parameter values indicating the communication capability of the slave devices 1a to 1c (through the comparison), and sets each detected value for a different parameter as the corresponding parameter value to be used as the comparison result Comp3. The hub 3 generates the comparison result Comp3 in this manner.

(3) The hub 3 transmits, to the master device, a parameter obtaining command 1405 to which the comparison result Comp3 generated by comparing the payloads has been added as a new payload.

The master device 2 receives the parameter obtaining command 104 transmitted from the hub 3. The parameter values stored in the payload Comp3 added to the command 104 are parameter values satisfied by all the slave devices 1a to 1c. More specifically, each parameter value stored in the payload Comp3 is the lower limit value of the communication capability of the slave devices 1a to 1c.

As shown in FIG. 14A(b), the master device 2 receives the parameter obtaining command 1405. Based on the values set in the payload of the command, the master device 2 sets parameters Param0123 satisfied by the master device 2 and the slave devices 1a to 1c as the communication setting parameters SETTING to be used by the parameter setting unit of the master device 2. The master device 2 then transmits, as a broadcast command, a parameter setting command 1406 to which the parameters Param0123 have been added as a payload.

The hub 3 transmits the broadcast command 1406 received from the master device 2 to the slave devices 1a to 1c.

The slave devices 1a to 1c receive the broadcast command 1406 from the hub 3, and set the parameters Param0123 stored in the payload of the command as the communication setting parameters SETTING to be used by the parameter setting units of the slave devices, and then transmit the received command 1406 without changing the command.

The hub 3 receives the command 1406 from the slave devices 1a to 1c, and transmits the received command to the master device 2 without changing the command.

In this manner, the broadcast command 1406 is transferred to the slave devices 1a to 1c. The master device 2 finally receives the broadcast command 1406. This completes the configuration process performed in the communication system 1000.

Figure 14B:
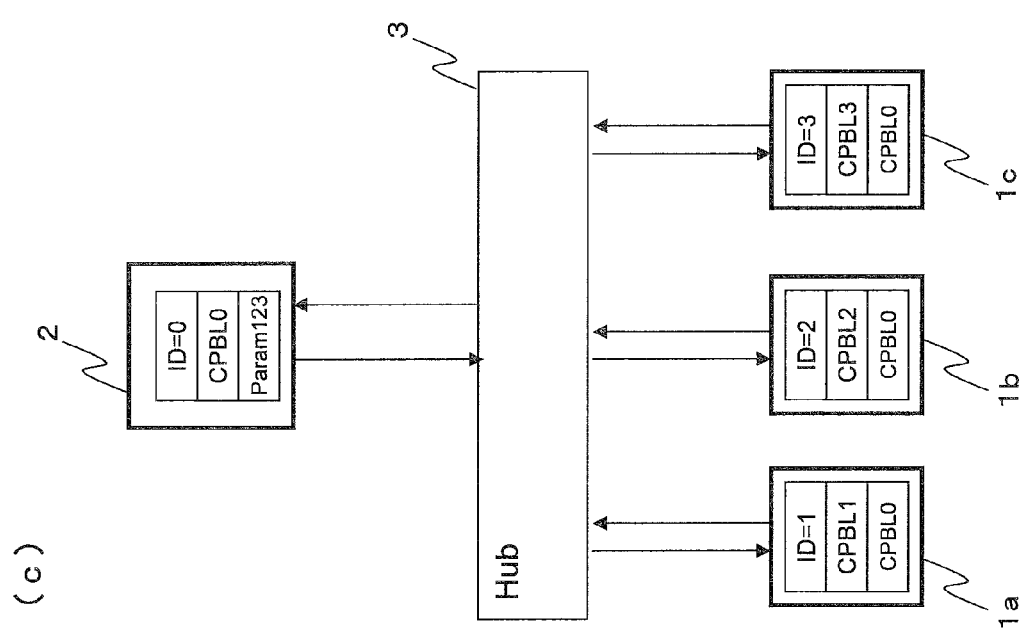
FIG. 14B(c) is a diagram describing transmission of a master device setting value by a master device in a hub topology.

The parameters may be set in the manner described below as shown in FIG. 14B. The master device 2 obtains the parameters using the parameter obtaining command, or specifically obtains the parameters Param123 commonly satisfied by the slave devices 1a to 1c, and sets the obtained parameters as parameters to be used by the parameter setting unit of the master device 2. The parameters CPBL0 stored in the parameter display unit of the master device 2 are set as parameters to be used by the slave devices 1a to 1c. Under these settings, the master device 2 stores the parameters commonly satisfied by the slave devices 1a to 1c as its parameters SETTING, whereas the slave devices 1a to 1c store the parameters CPBL0 satisfied by the master device 2 as their parameters SETTING. When communication always occurs only between the master device and the slave devices in the communication system 1000 and no communication occurs between the slave devices, the above parameter settings enable the communication system 1000 to perform such communication (between the master device and the slave devices).

Figure 14C:
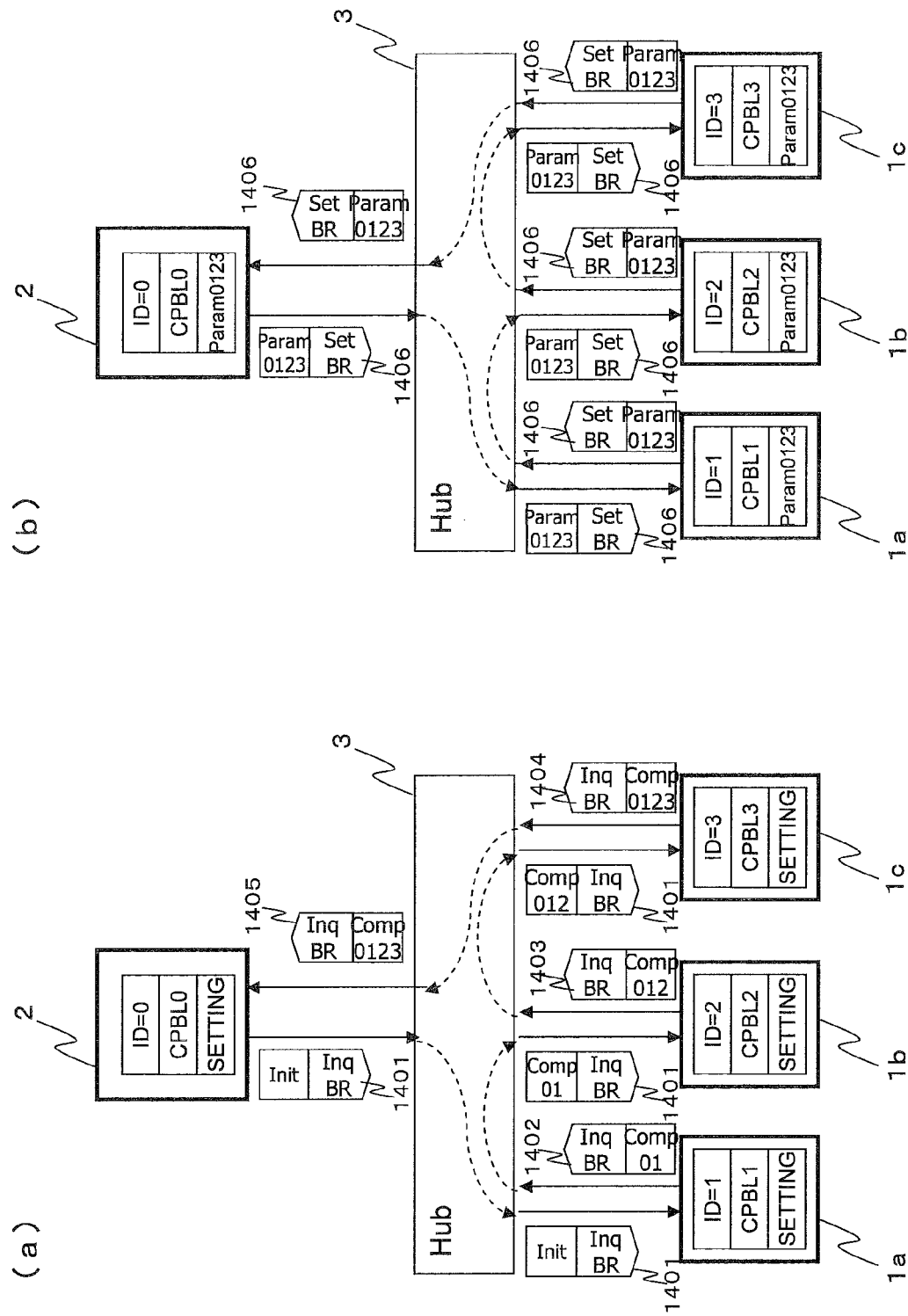
FIG. 14C(a) is a diagram describing broadcast transmission of initial values by a master device in a hub topology (equivalent to a ring topology), and FIG. 14C(b) is a diagram describing broadcast transmission of parameter setting values by a master device in a hub topology (equivalent to a ring topology).

As shown in FIGS. 14C(a) and 14C(b), the hub 3 may be formed to transmit a command (data) from the master device 2, first to (1) the slave device 1a, (2) the slave device 1b, and (3) the slave device 1c in the stated order. In this case, the communication system 1000 having the hub topology can be regarded as equivalent to the system having the ring topology described above. In this case, the configuration process described above for the ring topology can be performed in the communication system 1000 having the hub topology. The state shown in FIG. 14C(a) corresponds to the state shown in FIG. 10A(a), and the state shown in FIG. 14C(b) corresponds to the state shown in FIG. 10A(b).

As described above with reference to the drawings, when the communication system 1000 of the first embodiment includes a master device and a plurality of slave devices, the master device generates a parameter obtaining command and a parameter setting command as broadcast commands and performs the configuration process using the broadcast commands. In the communication system 1000, the number of commands to be generated is fixed irrespective of the number of slave devices connected in the system. As a result, the communication system 1000 enables the configuration process of all the slave devices to be performed using a smaller number of commands. This shortens the initialization time of the slave devices.

The communication system 1000 uses the same parameter obtaining command and the same parameter setting command for any topology used to connect the master device and the slave device(s) as commands transmitted or received while the master device and the slave devices are operating or are engaged in processing. Irrespective of whether the communication system 1000 uses a point-to-point topology in which the master device and the single slave device are connected or a point-to-multipoint topology in which the master device and the plurality of slave devices are connected, the same parameter obtaining command and the same parameter setting command can be generated as broadcast commands to perform the configuration process in the system. This enables the communication system to be formed using the same master device and the same slave device(s) for a variety of topologies that can be selected in a flexible manner.

Second Embodiment

A second embodiment of the present invention will now be described with reference to the drawings.

A communication system according to the second embodiment has the same structure as the communication system 1000 of the first embodiment. The communication system of the second embodiment differs from the system of the first embodiment only in the processing method.

2.1 Second Configuration Process

A second configuration process performed in the communication system of the second embodiment will now be described. The same components are given the same reference symbols or numerals unless otherwise specified.

2.1.1 Second Configuration Process for Ring Topology

A second configuration process performed for a ring topology will now be described.

Figure 11A:
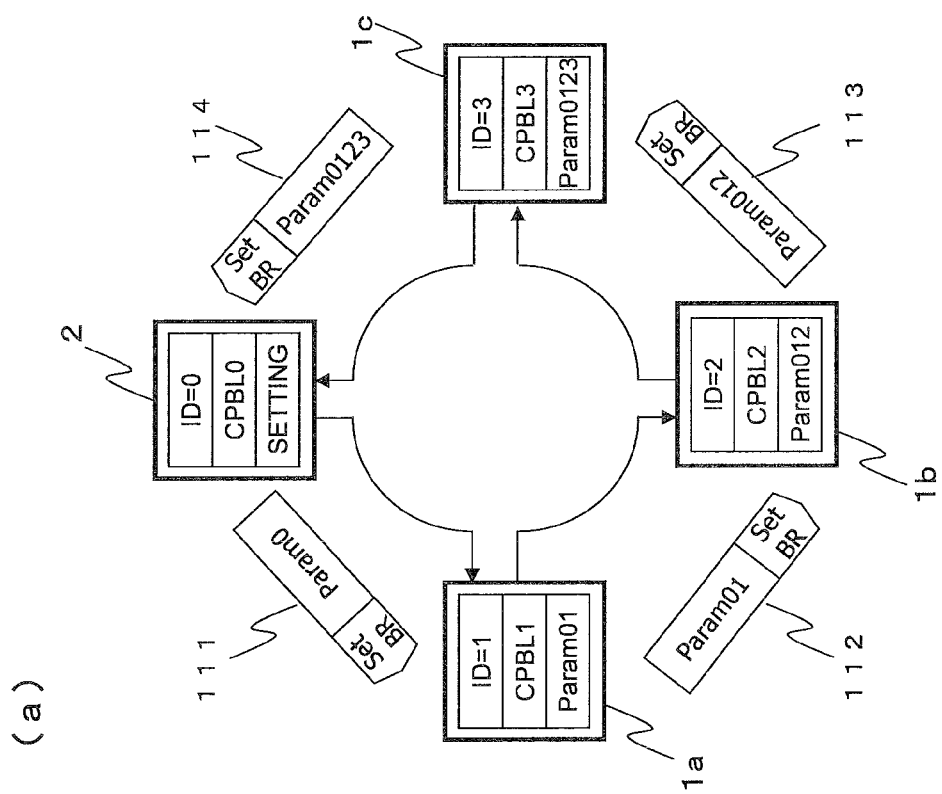
FIG. 11A(a) is a diagram describing broadcast transmission of freely selected initial values set in a payload transmitted by a master device in a ring topology.

FIGS. 11A and 11B are diagrams describing the second configuration process performed in a ring topology in which the master device 2 and the slave devices 1a to 1c are connected in a ring.

As shown in FIG. 11A(a), the master device 2 transmits, as a broadcast command, a parameter setting command 111 to which initial values Param0 have been added as a payload. The values Param0 may be freely selected values, or may be the values of the communication capability parameters CPBL0 stored in the parameter display unit of the master device 2. Alternatively, these two different values may be used as values Param0 for different parameters (freely selected values to be set as initial values may be used for some parameters and the values of communication capability parameters CPBL0 stored in the parameter display unit of the master device 2 may be used for other parameters).

The slave device 1a receives the parameter obtaining command 111, and compares the values Param0 added to the command and the corresponding communication capability parameters CPBL1 stored in the parameter display unit of the slave device 1a (compares the initial values Init set for the different parameters and the corresponding communication capability parameters CPBL1), and sets the comparison result Param01 as communication setting parameters SETTING to be used by the parameter setting unit of the slave device 1a. The slave device 1a then transmits, to the subsequent slave device 1b, a parameter setting command 112 to which the comparison result Param01 has been added as a new payload.

In the same manner, the slave device 1b receives the parameter setting command 112 from the slave device 1a, and compares the parameters Param01 and the parameters CPBL2, and sets the comparison result Param012 as communication setting parameters SETTING to be used by the parameter setting unit of the slave device 1b. The slave device 1b then transmits, to the subsequent slave device 1c, a parameter setting command 113 to which the comparison result Param012 has been added as a new payload.

In the same manner, the slave device 1c compares the parameters Param012 and the parameters CPBL3, and sets the comparison result Param0123 as communication setting parameters SETTING to be used by the parameter setting unit of the slave device 1c, and transmits, to the master device 2, a parameter setting command 114 to which the comparison result Param0123 has been added as a new payload.

The master device 2 receives the parameter setting command 114. The parameters Param0 are used as the initial values. In this case, the parameter values stored in the payload Param0123 added to this parameter setting command 114 are parameter values satisfied by all the slave devices 1a to 1c.

The parameters stored in the payload Param0123 may either be different from or be the same as the initial values stored in the payload Param0 (the payload Param0 added to the command generated by the master device 2). The processing performed when (1) Param0123≠Param0 and the processing performed when (2) Param0123=Param0 will now be described separately.

When Param0123≠Param0

FIG. 11B(b-1) shows the processing performed by the master device 2 when the parameters Param0123 stored in the payload of the parameter setting command 114 received by the master device 2 differ from the parameters Param0 stored in the payload of the parameter setting command 111 that the master device 2 has transmitted.

As shown in FIG. 11B(b-1), when the master device 2 detects that the transmitted parameters Param0 and the received parameters Param0123 differ from each other, the master device 2 again transmits a parameter setting command 115 in which the received parameters Param0123 have been set as a payload. In this case, the parameters Param0123 are the values satisfied by all the slave devices 1a to 1c. Thus, the slave devices 1a to 1c inevitably obtain the parameters Param0123 as the comparison result by comparing the parameters Param0123 added to the command and the communication capability parameters CPBL1 to CPBL3 stored in the parameter display units of the slave devices after the slave devices 1a to 1c receive the parameter setting command 115. In this case, the slave devices 1a to 1c set the parameters Param0123 as the communication setting parameters SETTING to be used by their parameter setting units, and then transmit the parameter setting command 115.

The master device 2 finally receives the parameter setting command 115. This completes the configuration process.

When Param0123=Param0

FIG. 11B(b-2) shows the processing performed by the master device 2 when the parameters Param0123 stored in the payload of the parameter setting command 114 received by the master device 2 are the same as the parameters Param0 stored in the payload of the parameter setting command 111 that the master device 2 has transmitted. In this case, the master device 2 uses the result of comparison performed between the slave devices 1a to 1c as the parameters Param0 and transmits the parameters Param0. The values of the parameters Param0 are the same as the parameter values set as the communication setting parameters SETTING to be used by the parameter setting units of the slave devices. In this case, the master device 2 sets the received parameters Param0123, which are the same as the transmitted parameters Param0, as the communication setting parameters SETTING to be used by the parameter setting unit of the master device 2. This completes the configuration process.

When Param0123=Param0, the slave devices 1a to 1c are guaranteed to have the communication capability equal to or higher than the communication capability indicated by the parameter values set as the parameters Param0. Thus, when Param0123=Param0, the master device 2 is simply required to generate a command only once before completing the configuration process performed in the communication system of the present embodiment.

The second configuration process of the present embodiment will now be described with reference to a flowchart.

Figure 11C:
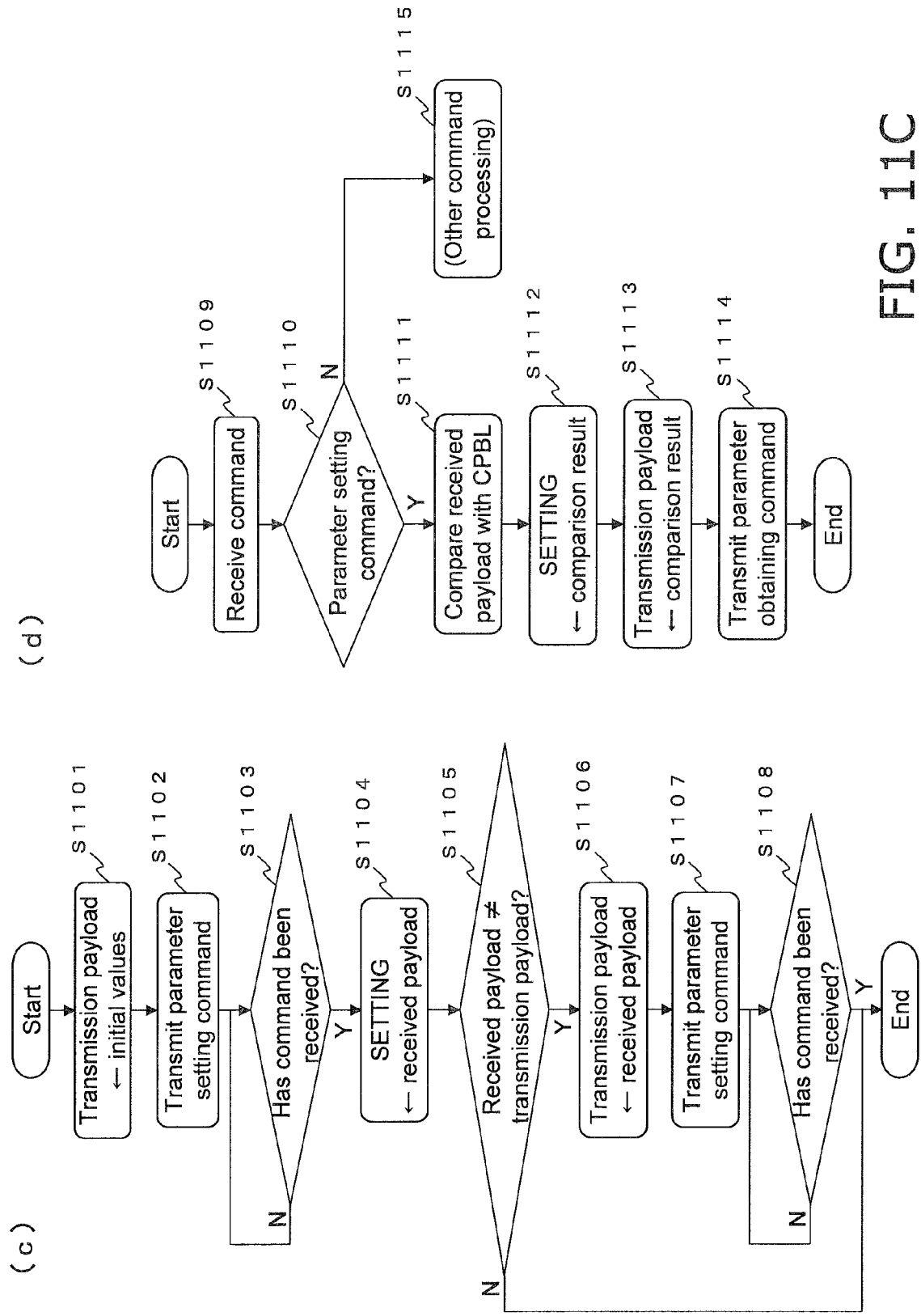
FIG. 11C(c) is a flowchart showing a configuration process of a master device, and FIG. 11C(d) is a flowchart showing a configuration process of a slave device.

FIGS. 11C(c) and 11C(d) are flowcharts showing the second configuration process performed by the master device 2 and by the slave devices 1a to 1c.

Processing Performed by Master Device

S1101:

As shown in FIG. 11C(c), the master device 2 sets the initial values in a payload of a parameter obtaining command (S1101).

S1102:

The master device 2 transmits, as a broadcast command, the parameter obtaining command in which the initial values have been set in the payload (S1102).

S1103:

The master device 2 waits until receiving the command that the master device 2 has transmitted (waits until the command is returned) (S1103). Although the initial values include the parameters satisfied by the master device 2 in this example, the initial values may be other values as described above. For example, the parameters CPBL0 stored in the parameter display unit of the master device 2 may be set as the initial values.

S1104:

The master device 2 receives the command, and sets values stored in the payload added to the received command as the parameters SETTING to be used by the parameter setting unit of the master device (S1104).

S1105:

The master device 2 then detects whether the received payload and the transmitted payload are the same (S1105). When the payloads are the same, the master device 2 completes the configuration process.

S1106:

When the received payload and the transmitted payload are not the same, the master device 2 sets the received payload as a payload to be transmitted (transmitted payload) (S1106).

S1107:

The master device 2 transmits, as a broadcast command, a parameter setting command in which the received payload has been set as the transmitted payload (S1107).

S1108:

The master device 2 receives the command that the master device 2 has transmitted (S1108). This completes the configuration process.

Processing Performed by Slave Device

FIG. 11C(d) shows the processing performed by the slave devices 1a to 1c.

S1109:

The slave devices 1a to 1c receive a command (S1109).

S1110:

The slave devices 1a to 1c determine whether the received command is a parameter setting command (S1110).

S1111:

When determining that the received command is a parameter setting command in step S1110, the slave devices 1a to 1c compare the values stored in the payload added to the received command with the parameters (the communication capability parameters CPBL) stored in the parameter display units of the slave devices (S1111).

S1112:

The slave devices 1a to 1c set the comparison result obtained in step S1111 as the communication setting parameters SETTING to be used by the parameter setting units of the slave devices (S1112).

S1113:

The slave devices 1a to 1c store, in a new payload, the comparison result obtained in step S1111, which has been set as the parameters SETTING to be used by their parameter setting units in step S1111 (S1113).

S1114:

The slave devices 1a to 1c transmit a parameter obtaining command to which the new payload has been added (S1114).

As described above, the master device 2 and the slave devices 1a to 1c perform the configuration process using the parameter setting command in the communication system of the present embodiment.

2.1.2 Second Configuration Process for Chain Topology

A second configuration process performed in the communication system having a chain topology will now be described.

FIG. 13 is a diagram describing a second configuration process performed in the communication system of the second embodiment having a chain topology in which the master device 2 and the slave devices 1a to 1c are connected in a chain.

As shown in FIG. 13(a), the master device 2 transmits, as a broadcast command, a parameter setting command 1301 to which the initial values Param0 have been added as a payload. The values Param0 may be freely selected values, or may be the values of the communication capability parameters CPBL0 stored in the parameter display unit of the master device 2. Alternatively, these two different values may be used as values Param0 for different parameters (freely selected values to be set as initial values may be used for some parameters and the values of communication capability parameters CPBL0 stored in the parameter display unit of the master device 2 may be used for other parameters).

The slave device 1a receives the parameter setting command 1301, and compares the values Param0 added to the command and the corresponding communication capability parameters CPBL1 stored in the parameter display unit of the slave device 1a, and sets the values obtained as the comparison result Param01 as the communication setting parameters SETTING to be used by the parameter setting unit of the slave device 1a. The slave device 1a also transmits, to the subsequent slave device 1b, a parameter setting command 1302 to which the parameters Param01 have been added as a new payload.

In the same manner, the slave device 1b receives the parameter setting command 1302, and compares the parameters Param01 and the corresponding parameters CPBL2, and sets the values obtained as the comparison result Param012 as the communication setting parameters SETTING to be used by the parameter setting unit of the slave device 1b. The slave device 1b then transmits, to the subsequent slave device 1c, a parameter setting command 1303 to which the comparison result Param012 has been added as a new payload.

In the same manner, the slave device 1c compares the parameters Param012 and CPBL3, and sets the values obtained as the comparison result Param0123 as the communication setting parameters SETTING to be used by the parameter setting unit of the slave device 1c, and transmits a command 1304 to which the comparison result Param0123 has been added as a new payload.

The slave devices 1b and 1c transmit the received command 1304 without changing the command.

The master device 2 receives the parameter setting command 1304. The parameters Param0 are used as the initial values. In this case, the parameter values stored in the payload Param0123 added to this parameter setting command 1304 are parameter values satisfied by all the slave devices 1a to 1c.

The values stored in the payload Param0123 may either be different from or be the same as the initial values Param0 (the payload Param0 added to the command generated by the master device 2). The processing performed when (1) Param0123≠Param0 and the processing performed when (2) Param0123=Param0 will now be described separately.

When Param0123≠Param0

FIG. 13(b-1) shows the processing performed by the master device 2 when the parameters Param0123 stored in the payload of the parameter setting command 1304 received by the master device 2 differ from the parameters Param0 stored in the payload of the parameter setting command 1301 that the master device 2 has transmitted.

As shown in FIG. 13(b-1), when the master device 2 detects that the transmitted parameters Param0 and the received parameters Param0123 differ from each other, the master device 2 again transmits a parameter setting command 1305 in which the received parameters Param0123 have been set as a payload. In this case, the parameters Param0123 are the values satisfied by all the slave devices 1a to 1c. Thus, the slave devices 1a to 1c inevitably obtain the parameters Param0123 as the comparison result by comparing the parameters Param0123 added to the command and the communication capability parameters CPBL1 to CPBL3 stored in the parameter display units of the slave devices after the slave devices 1a to 1c receive the parameter setting command 1305. In this case, the slave devices 1a to 1c set the parameters Param0123 as the communication setting parameters SETTING to be used by their parameter setting units, and then transmit the parameter setting command 1305.

The master device 2 finally receives the parameter setting command 1305. This completes the configuration process.

When Param0123=Param0

FIG. 13(b-2) shows the processing performed by the master device 2 when the parameters Param0123 stored in the payload of the parameter setting command 1304 received by the master device 2 are the same as the parameters Param0 stored in the payload of the parameter setting command 111 that the master device 2 has transmitted. In this case, the parameters Param0 transmitted by the master device 2 are the values obtained by the comparison performed between the slave devices 1a to 1c. The values of the parameters Param0 are the same as the parameter values set as the communication setting parameters SETTING to be used by the parameter setting units of the slave devices. In this case, the master device 2 sets the received parameters Param0123, which are the same as the transmitted parameters Param0, as the communication setting parameters SETTING to be used by the parameter setting unit of the master device 2. This completes the configuration process.

When Param0123=Param0, the slave devices 1a to 1c are guaranteed to have the communication capability equal to or higher than the communication capability indicated by the parameter values set as the parameters Param0. Thus, when Param0123=Param0, the master device 2 is simply required to generate a command only once before completing the configuration process performed in the communication system of the present embodiment.

2.1.3 Second Configuration Process for Hub Topology

A second configuration process performed in a hub topology will now be described.

Figure 15A:
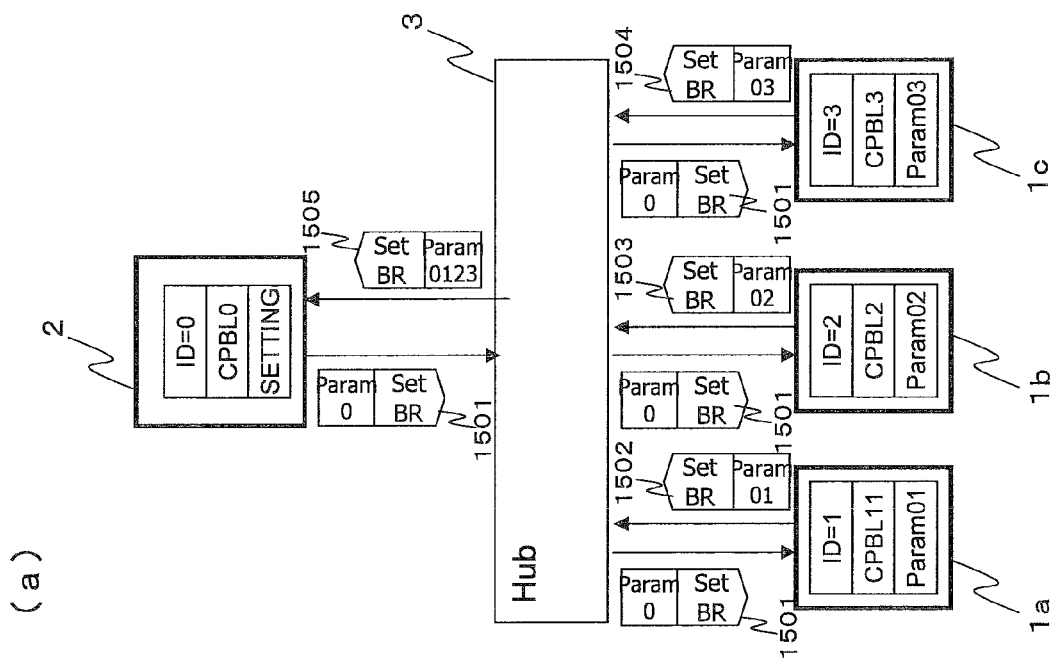
FIG. 15A(a) is a diagram describing transmission of freely selected initial values set in a payload transmitted by a master device in a hub topology.
Figure 15B:
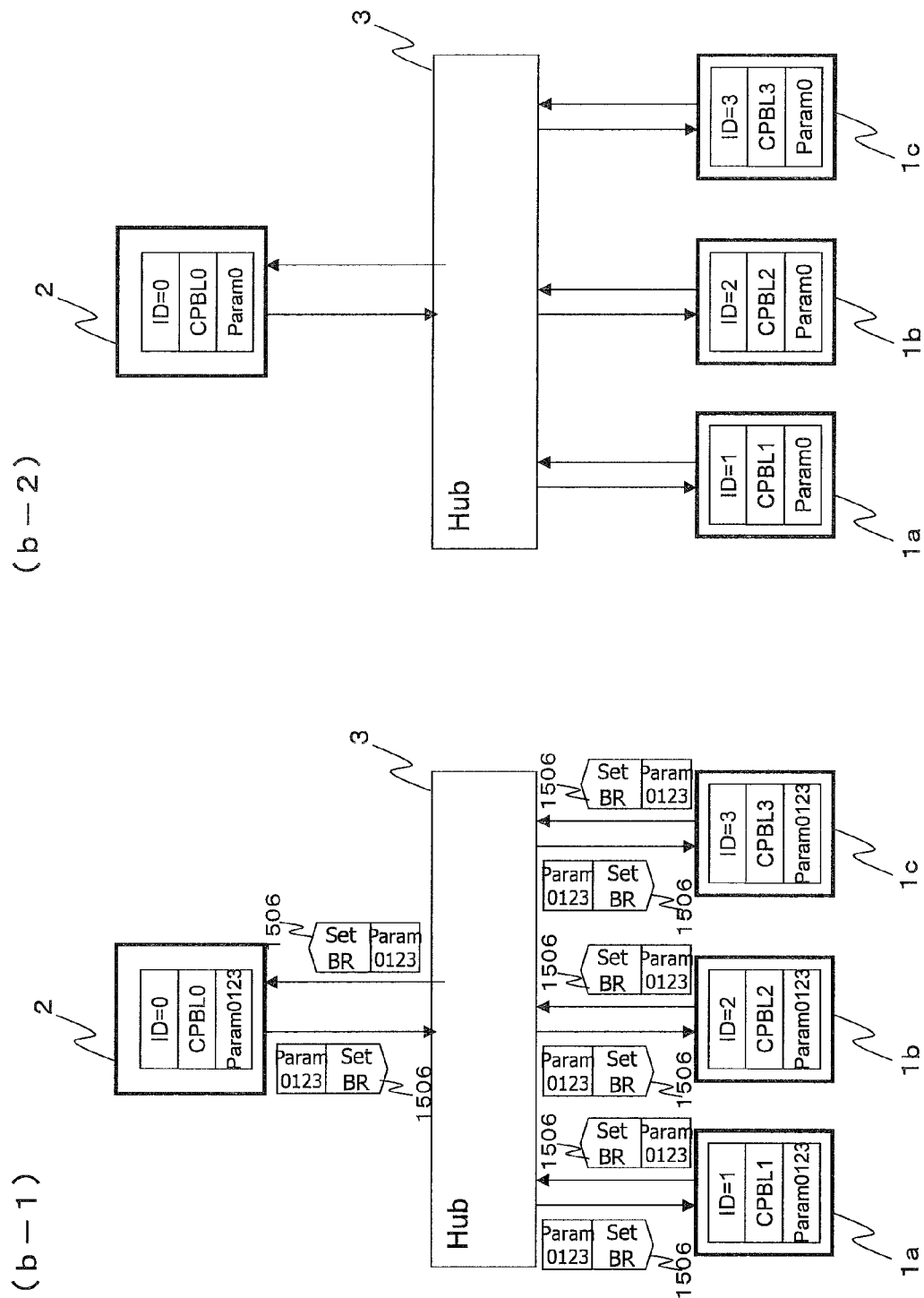
FIG. 15B(b-1) is a diagram describing communication in which parameters transmitted by a master device and parameters received by the parameter in a hub topology are different, and FIG. 15B(b-2) is a diagram describing communication in which the transmitted parameters and the received parameters are the same.

FIGS. 15A and 15B are diagrams describing a second configuration process performed in the communication system of the second embodiment having a hub topology in which the master device 2 and the slave devices 1a to 1c are connected using a hub.

As shown in FIG. 15A(a), the master device 2 transmits, as a broadcast command, a parameter setting command 1501 to which the initial values Param0 have been added as a payload. The values Param0 may be freely selected values, or may be the values of the communication capability parameters CPBL0 stored in the parameter display unit of the master device 2. Alternatively, these two different values may be used as values Param0 for different parameters (freely selected values to be set as initial values may be used for some parameters and the values of communication capability parameters CPBL0 stored in the parameter display unit of the master device 2 may be used for other parameters).

The hub 3 receives the parameter setting command 1501 from the master device 2, and transmits the received command to the slave devices 1a to 1c.

The slave devices 1a to 1c receive the parameter setting command 1501 from the hub 3, and compare the value Param0 added to the command and the communication capability parameters CPBL1 to CPBL3 stored in the parameter display units of the slave devices, and set the comparison results Param01, Param02, and Param03 as the communication setting parameters SETTING to be used by the parameter setting units of the slave devices. The slave devices 1a to 1c also transmit, to the hub 3, parameter setting commands 1502, 1503, and 1504 to which the comparison results Param01, Param02, and Param03 have been added as new payloads.

The hub 3 compares the values Param01, Param02, and Param03 stored in the payloads of the received commands 1502 to 1504, and transmits, to the master device 2, a command 1505 to which the comparison result Param0123 has been added as a new payload.

The master device 2 receives the parameter setting command 1505. The parameters Param0 are used as the initial values. In this case, the parameter values stored in the payload Param0123 added to the parameter setting command 1505 are parameter values satisfied by all the slave devices 1a to 1c.

The parameters stored in the payload Param0123 may either be different from or be the same as the initial values stored in the payload Param0 (the payload Param0 added to the command generated by the master device 2). The processing performed when (1) Param0123≠Param0 and the processing performed when (2) Param0123=Param0 will now be described separately.

When Param0123≠Param0

FIG. 15B(b-1) shows the processing performed by the master device 2 when the parameters Param0123 stored in the payload of the parameter setting command 1505 received by the master device 2 differ from the parameters Param0 stored in the payload of the parameter setting command 1501 that the master device 2 has transmitted.

As shown in FIG. 15B(b-1), when the master device 2 detects that the transmitted parameters Param0 and the received parameters Param0123 differ from each other, the master device 2 again transmits a parameter setting command 1506 in which the received parameters Param0123 have been set as a payload. In this case, the parameters Param0123 are the values satisfied by all the slave devices 1a to 1c. Thus, the slave devices 1a to 1c inevitably obtain the parameters Param0123 as the comparison result by comparing the parameters Param0123 added to the command and the communication capability parameters CPBL1 to CPBL3 stored in the parameter display units of the slave devices after the slave devices 1a to 1c receive the parameter setting command 1506. In this case, the slave devices 1a to 1c set the parameters Param0123 as the communication setting parameters SETTING to be used by their parameter setting units, and then transmit the parameter setting command 1506.

The master device 2 finally receives the command 1506. This completes the configuration process.

When Param0123=Param0

FIG. 15B(b-2) shows the processing performed by the master device 2 when the parameters Param0123 stored in the payload of the parameter setting command 1505 received by the master device 2 are the same as the parameters Param0 stored in the payload of the parameter setting command 1501 that the master device 2 has transmitted. In this case, the master device 2 uses the result of comparison performed between the slave devices 1a to 1c as the parameters Param0 and transmits the parameters Param0. The values of the parameters Param0 are the same as the parameter values set as the communication setting parameters SETTING to be used by the parameter setting units of the slave devices. In this case, the master device 2 sets the received parameters Param0123, which are the same as the transmitted parameters Param0, as the communication setting parameters SETTING to be used by the parameter setting unit of the master device 2. This completes the configuration process.

When Param0123=Param0, the slave devices 1a to 1c are guaranteed to have the communication capability equal to or higher than the communication capability indicated by the parameter values set as the parameters Param0. Thus, when Param0123=Param0, the master device 2 is simply required to generate a command only once before completing the configuration process performed in the communication system of the present embodiment.

Figure 15C:
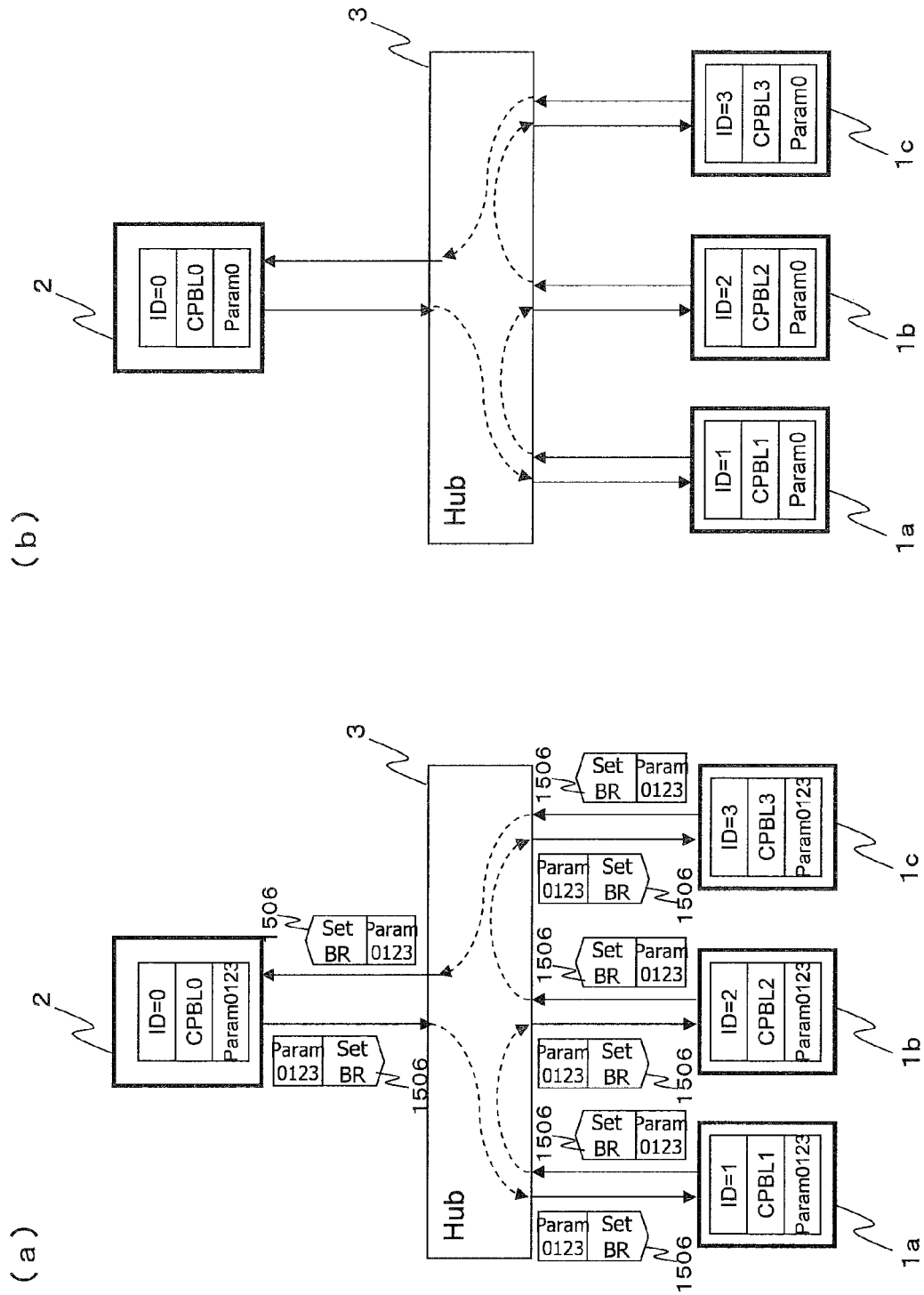
FIG. 15C(a) is a diagram describing communication in which parameters transmitted by a master device and parameters received by the parameter in a hub topology are different (equivalent to a ring topology), and FIG. 15C(b) is a diagram describing communication in which the transmitted parameters and the received parameters are the same (equivalent to a ring topology).

As shown in FIG. 15C, the hub 3 may be formed to transmit a command (data) from the master device 2, first to (1) the slave device 1a, (2) the slave device 1b, and (3) the slave device 1c in the stated order. In this case, the communication system 1000 having the hub topology can be regarded as equivalent to the system having the ring topology described above. In this case, the configuration process described above for the ring topology can be performed in the communication system 1000 having the hub topology. The state shown in FIG. 15C(a) corresponds to the state shown in FIG. 11B(b-1), and the state shown in FIG. 15C(b) corresponds to the state shown in FIG. 11B(b-2).

As described above with reference to the drawings, the master device 2 in the communication system of the present embodiment is required to transmit a parameter setting command twice at maximum before completing the configuration process.

In an embedded system in which the master device 2 and the slave devices 1a to 1c are mounted on the same substrate, parameters to be set may be prestored in, for example, a ROM or a nonvolatile memory such as a flash memory included in the master device, and the parameters stored in the ROM or in the nonvolatile memory may be set using a parameter setting command when the system is initialized. In this case, the parameters of the slave devices 1*a* to 1*c* can be set using the prestored parameters (when the parameters are preset in a manner to guarantee the communication capability corresponding to the capability achieved when Param0123=Param0 described above). This structure requires a parameter setting command to be generated only once before completing the configuration process.

Other Embodiments

Although the embodiments of the present invention have been described with reference to the drawings, the specific structures of the present invention should not be limited to the above embodiments, but may be modified variously without departing from the scope and the spirit of the invention. For example, the number of slave devices may be freely selected from one or more. The configuration process can also be performed using a broadcast command in a point-to-point topology in which a master device is connected to a single slave device.

In the communication system of the present invention, the master device may first collectively obtain the parameters of each slave device using a broadcast command transmitted to the plurality of slave devices, and then may separately set the parameters of each slave device using a device-specific command intended for each specific slave device. Alternatively, the configuration process may be entirely performed using device-specific commands in the communication system depending on the type or the number of slave devices connected in the system.

In the communication system of the present invention, the master device may first separately obtain the parameters of each slave device using device-specific commands each of which is intended for a different slave device, and then may collectively set the parameters of each slave device using a broadcast command intended for all the slave devices.

Each block of the communication system, the master device, and the slave devices described in the above embodiments may be formed using a single chip with a semiconductor device, such as LSI (large-scale integration), or some or all of the blocks of the communication system, the master device, and the slave devices may be formed using a single chip.

Although LSI is used as the semiconductor device technology, the technology may be IC (integrated circuit), system LSI, super LSI, or ultra LSI depending on the degree of integration of the circuit.

The circuit integration technology employed should not be limited to LSI, but the circuit integration may be achieved using a dedicated circuit or a general-purpose processor. A field programmable gate array (FPGA), which is an LSI circuit programmable after manufactured, or a reconfigurable processor, which is an LSI circuit in which internal circuit cells are reconfigurable or more specifically the internal circuit cells can be reconnected or reset, may be used.

Further, if any circuit integration technology that can replace LSI emerges as an advancement of the semiconductor technology or as a derivative of the semiconductor technology, the technology may be used to integrate the functional blocks. Biotechnology is potentially applicable.

The processes described in the above embodiments may be implemented using either hardware or software (which may be combined together with operating system (OS), middleware, or predetermined library), or may be implemented using both software and hardware. When each of the communication system, the master device, and the slave devices of the above embodiments is implemented by hardware, the communication system, the master device, and the slave devices require timing adjustment for their processes. For ease of explanation, the timing adjustment associated with various signals required in an actual hardware design is not described in detail in the above embodiments.

The processes described in the above embodiments may not be performed in the order specified in the above embodiments, but the order in which the processes are performed may be changed without departing from the scope and the spirit of the invention.

The specific structures described in the above embodiments are mere examples of the present invention, and may be changed and modified variously without departing from the scope and spirit of the invention.

INDUSTRIAL APPLICABILITY

The communication system of the present invention including the master device and the plurality of slave devices, the master device of the present invention, and the slave device of the present invention enable the master device to set parameters of the slave devices in an efficient manner using a smaller number of commands. The present invention is applicable to, for example, a communication system in which a system LSI (large-scale integration) circuit functioning as a master device and a plurality of IO devices or memory devices functioning as slave devices are connected to each other, and shortens the initialization time required in the system and improves the responsiveness of the system.

The invention claimed is:

1. A slave device included in a communication system in which communication is performed between a master device and one or more slave devices by transmitting and receiving a plurality of commands and a response, the slave device comprising:

a master-device interface unit configured to communicate with the master device,
wherein the master-device interface unit includes
a parameter display unit configured to store a communication capability parameter indicating a communication capability of the slave device, and
a parameter setting unit configured to store a communication setting parameter to be used for communicating with the master device,
when having received, as a broadcast command to be received by all the slave devices that are connected in the communication system in a communicable manner, a parameter setting command for setting a parameter to be used by the parameter setting unit, the master-device interface unit sets the communication setting parameter of the parameter setting unit based on a value of a payload added to the received parameter setting command, and transmits a parameter setting command to which a payload storing a value of the set communication setting parameter of the parameter setting unit has been added,
before receiving and transmitting the parameter setting commands and when having received a parameter obtaining command to which a payload has been added, as another broadcast command to be received by all the slave devices that are connected in the communication system in a communicable manner, the master-device interface unit transmits a parameter obtaining command to which a payload generated based on the payload added to the received parameter obtaining command has been added, wherein the master-device interface unit compares a parameter value stored in the payload added to the received parameter obtaining command with a parameter value of the communication capability parameter stored by the parameter display unit, and sets a smaller one of the parameter values into the payload added to the parameter obtaining command to be transmitted and transmits the parameter obtaining command to which the payload storing the smaller value has been added.

2. The slave device according to claim 1, wherein the master-device interface unit sets a parameter stored in the payload added to the received parameter setting command as the parameter to be used by the parameter setting unit.

3. A slave device included in a communication system in which communication is performed between a master device and one or more slave devices by transmitting and receiving a plurality of commands and a response, the slave device comprising:

a master-device interface unit configured to communicate with the master device, wherein the master-device interface unit includes a parameter display unit configured to store a communication capability parameter indicating a communication capability of the slave device, and a parameter setting unit configured to store a communication setting parameter to be used for communicating with the master device, when having received, as a broadcast command to be received by all the slave devices that are connected in the communication system in a communicable manner, a parameter setting command for setting a parameter to be used by the parameter setting unit, the master-device interface unit sets the communication setting parameter of the parameter setting unit based on a value of a payload added to the received parameter setting command, and transmits a parameter setting command to which a payload storing a value of the set communication setting parameter of the parameter setting unit has been added, before receiving and transmitting the parameter setting commands and when having received a parameter obtaining command to which a payload has been added, as another broadcast command to be received by all the slave devices that are connected in the communication system in a communicable manner, the master-device interface unit transmits a parameter obtaining command to which a payload generated based on the payload added to the received parameter obtaining command has been added, wherein the master-device interface unit compares a parameter value stored in the payload added to the received parameter obtaining command with a parameter value of the communication capability parameter stored by the parameter display unit, and sets a larger one of the parameter values into the payload added to the parameter obtaining command to be transmitted and transmits the parameter obtaining command to which the payload storing the value indicating the longer time has been added.

4. A communication system in which communication is performed between a master device and one or more slave devices by transmitting and receiving a plurality of commands and a response, the system comprising:

a master device; and one or more slave devices, wherein the master device includes a parameter display unit configured to store a communication capability parameter indicating a communication capability of the master device and a parameter setting unit configured to store a communication setting parameter to be used for communicating with the one or more slave devices, and the master device transmits, as a broadcast command to be received by all the slave devices that are connected in the communication system in a communicable manner, a parameter setting command for setting a communication setting parameter to be used for communicating with the one or more slave devices, and wherein each of the one or more slave devices includes a parameter display unit configured to store a communication capability parameter indicating a communication capability of the slave device and a parameter setting unit configured to store a communication setting parameter to be used for communicating with the master device, and when any one of the slave devices has received the parameter setting command, the any one of the slave devices sets the communication setting parameter of the parameter setting unit based on a value of a payload added to the received parameter setting command, and transmits a parameter setting command to which a payload storing a value of the set communication setting parameter of the parameter setting unit has been added, and before transmitting the parameter setting command, the master device (i) transmits a parameter obtaining command to all the slave devices as another broadcast command and (ii) obtains the communication capability parameter stored in the parameter display unit of each of the slave devices, wherein when having received the parameter obtaining command as the broadcast command, the slave device transmits a parameter obtaining command to which a payload generated based on the payload added to the received parameter obtaining command has been added, and wherein a master-device interface unit included in the slave device compares a parameter value stored in the payload added to the received parameter obtaining command with a parameter value of the communication capability parameter stored in the parameter display unit, and sets a smaller one of the parameter values into the payload added to the parameter obtaining command to be transmitted and transmits the parameter obtaining command to which the payload storing the smaller value has been added.

5. The communication system according to claim 4, wherein the master device and the one or more slave devices are connected using a ring topology.

6. The communication system according to claim 4, wherein the master device and the one or more slave devices are connected using a hub topology.

7. A communication system in which communication is performed between a master device and one or more slave devices by transmitting and receiving a plurality of commands and a response, the system comprising:

a master device; and one or more slave devices, wherein the master device includes a parameter display unit configured to store a communication capability parameter indicating a communication capability of the master device and a parameter setting unit configured to store a communication setting parameter to be used for communicating with the one or more slave devices, and the master device transmits, as a broadcast command to be received by all the slave devices that are connected in the communication system in a communicable manner, a parameter setting command for setting a communication setting parameter to be used for communicating with the one or more slave devices, and wherein each of the one or more slave devices includes a parameter display unit configured to store a communication capability parameter indicating a communication capability of the slave device and a parameter setting unit configured to store a communication setting parameter to be used for communicating with the master device, and when any one of the slave devices has received the parameter setting command, the any one of the slave devices sets the communication setting parameter of the parameter setting unit based on a value of a payload added to the received parameter setting command, and transmits a parameter setting command to which a payload storing a value of the set communication setting parameter of the parameter setting unit has been added, and before transmitting the parameter setting command, the master device (i) transmits a parameter obtaining command to all the slave devices as another broadcast command and (ii) obtains the communication capability parameter stored in the parameter display unit of each of the slave devices, wherein when having received the parameter obtaining command as the broadcast command, the slave device transmits a parameter obtaining command to which a payload generated based on the payload added to the received parameter obtaining command has been added, and wherein a master-device interface unit included in the slave device compares a parameter value stored in the payload added to the received parameter obtaining command with a parameter value of the communication capability parameter stored in the parameter display unit, and sets a larger one of the parameter values into the payload added to the parameter obtaining command to be transmitted and transmits the parameter obtaining command to which the payload storing the value indicating the longer time has been added.

* * * * *